United States Patent [19]

Klinner

[11] Patent Number: 4,528,806

[45] Date of Patent: * Jul. 16, 1985

[54] CROP CONDITIONING APPARATUS AND METHOD

[75] Inventor: Wilfred E. Klinner, Milton Keynes, England

[73] Assignee: National Research Development Corporation, London, England

[ * ] Notice: The portion of the term of this patent subsequent to Aug. 16, 2000 has been disclaimed.

[21] Appl. No.: 408,877

[22] Filed: Aug. 17, 1982

Related U.S. Application Data

[63] Continuation of Ser. No. 173,136, filed as PCT GB 79/00053, Mar. 30, 1979, published as WO 79/00863 Nov. 1, 1979, § 102(e) date Nov. 30, 1979, Pat. No. 4,398,384.

[30] Foreign Application Priority Data

Mar. 31, 1978 [GB] United Kingdom .............. 12703/78

[51] Int. Cl.³ .......................................... A01D 43/10
[52] U.S. Cl. ...................................... 56/16.4; 56/364; 56/DIG. 1; 56/DIG. 2
[58] Field of Search ........... 56/DIG. 1, DIG. 2, 14.5, 56/16.4, 16.5, 13.6, 192, 364

[56] References Cited

U.S. PATENT DOCUMENTS

| | | | |
|---|---|---|---|
| 1,272,665 | 7/1918 | Isom | 56/126 |
| 1,972,680 | 9/1934 | Cushman | 56/DIG. 1 |
| 2,270,646 | 1/1942 | Campbell | 56/14.5 |
| 2,958,992 | 11/1960 | Bornzin | 56/DIG. 1 |
| 3,126,693 | 3/1964 | Renn | 56/400 |
| 3,487,612 | 1/1970 | Keller et al. | 56/DIG. 1 |
| 3,699,755 | 10/1972 | Hauser | 56/16.4 |
| 4,398,384 | 8/1983 | Klinner et al. | 56/14.5 |

FOREIGN PATENT DOCUMENTS

| | | | |
|---|---|---|---|
| 217670 | 1/1958 | Australia | 56/126 |
| 662303 | 12/1951 | United Kingdom | 56/DIG. 1 |
| 761587 | 11/1956 | United Kingdom | 56/DIG. 1 |

Primary Examiner—Jay N. Eskovitz
Attorney, Agent, or Firm—Cushman, Darby & Cushman

[57] ABSTRACT

In apparatus for conditioning crops such as grass, one or more conditioning devices engage crop passing through a passage and condition the crop by relative movement between the conditioning device and the crop. Preferably each conditioning device is a brush having a multiplicity of stiff, resilient, elongated elements which are yieldable in more than one plane in response to engagement by the crop by bending of the elements. One brush may form a rotary conveying device for conveying crop through the passage, and another brush may accelerate or retard the crop relative to the first brush. The second brush may be stationary or may be another rotary brush. The conditioning apparatus may be mobile or stationary, and when mobile may include cutting means for cutting crop to be conditioned.

26 Claims, 32 Drawing Figures

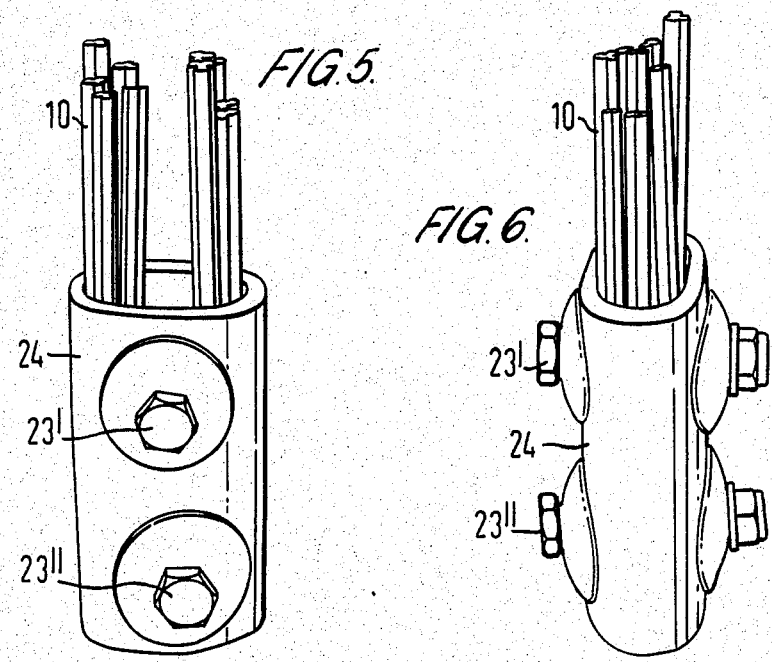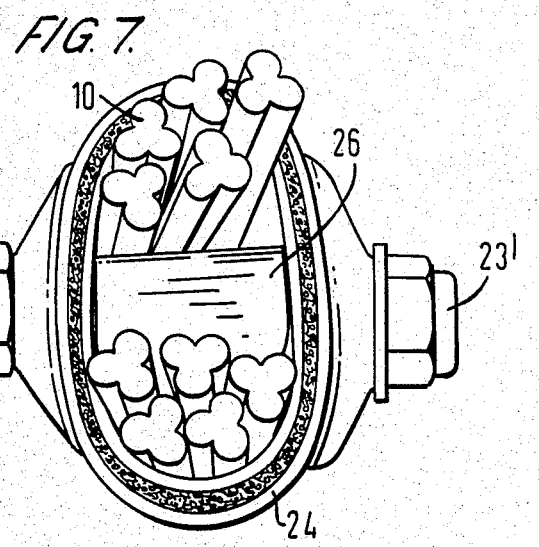

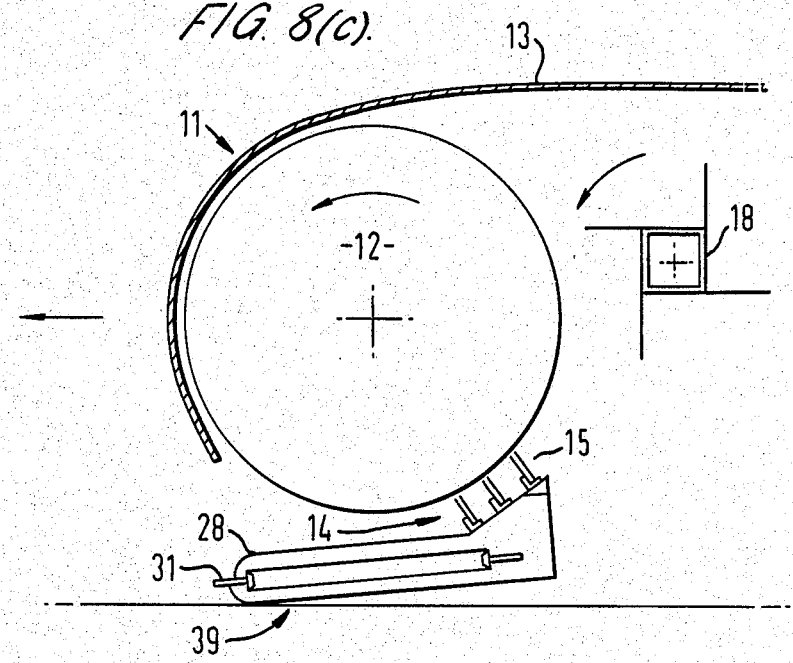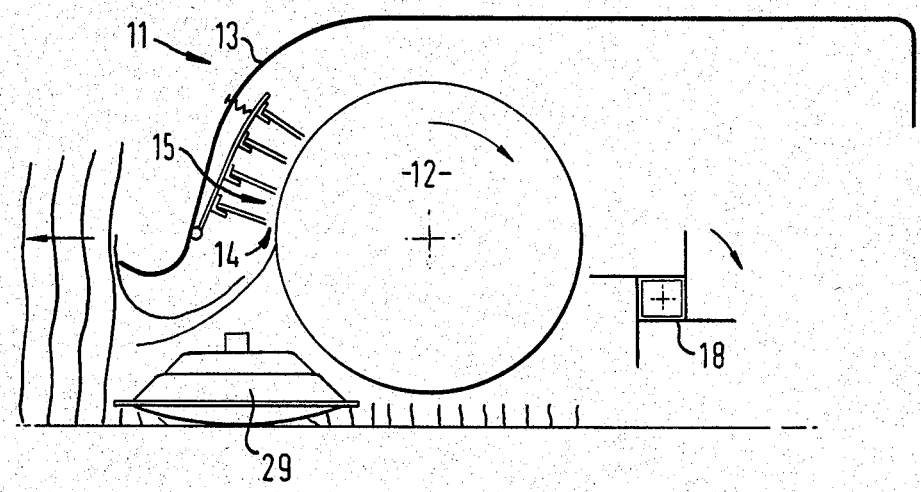

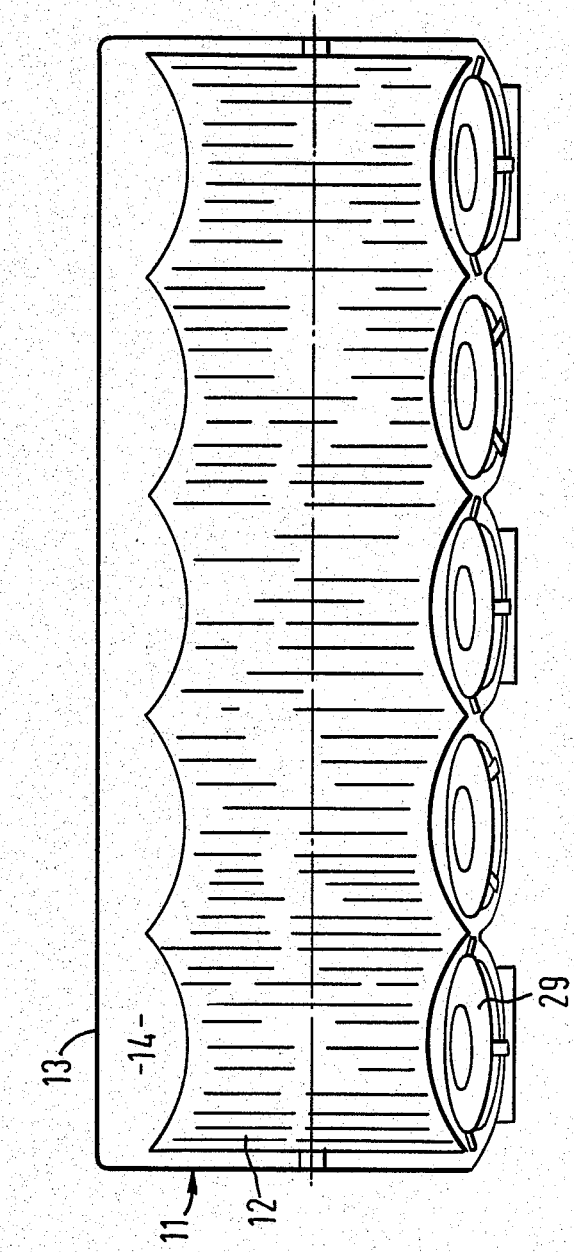

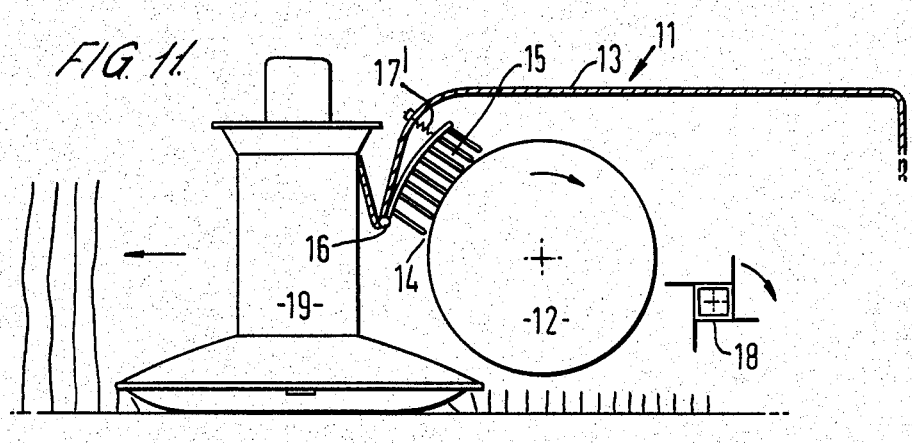
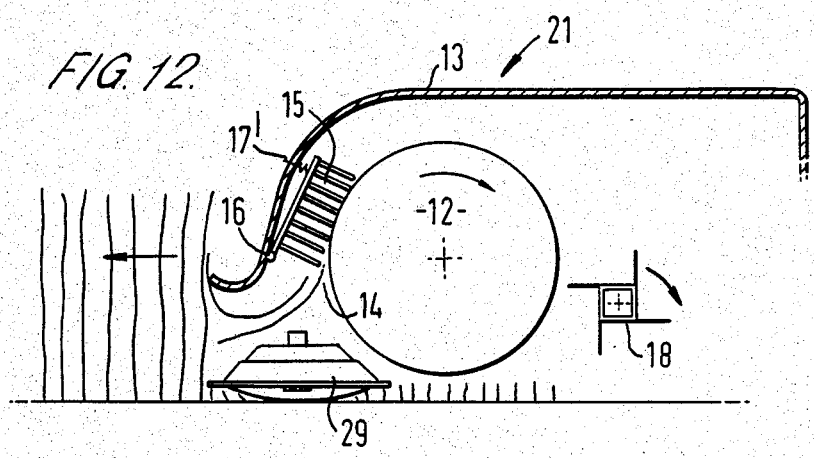
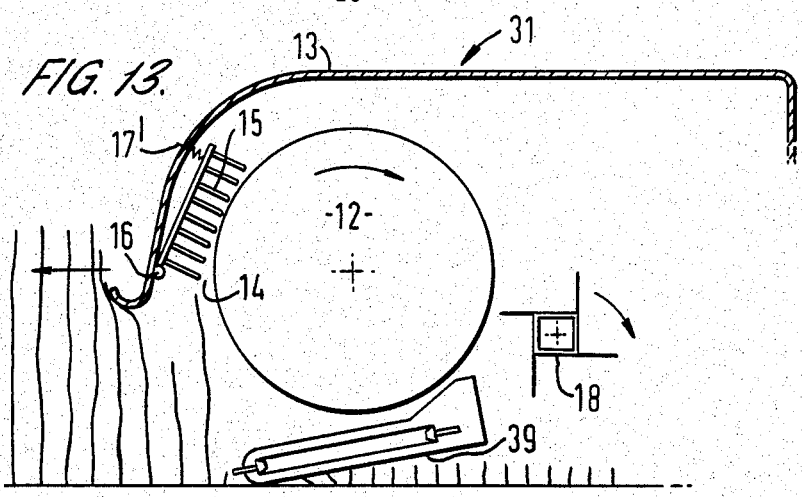

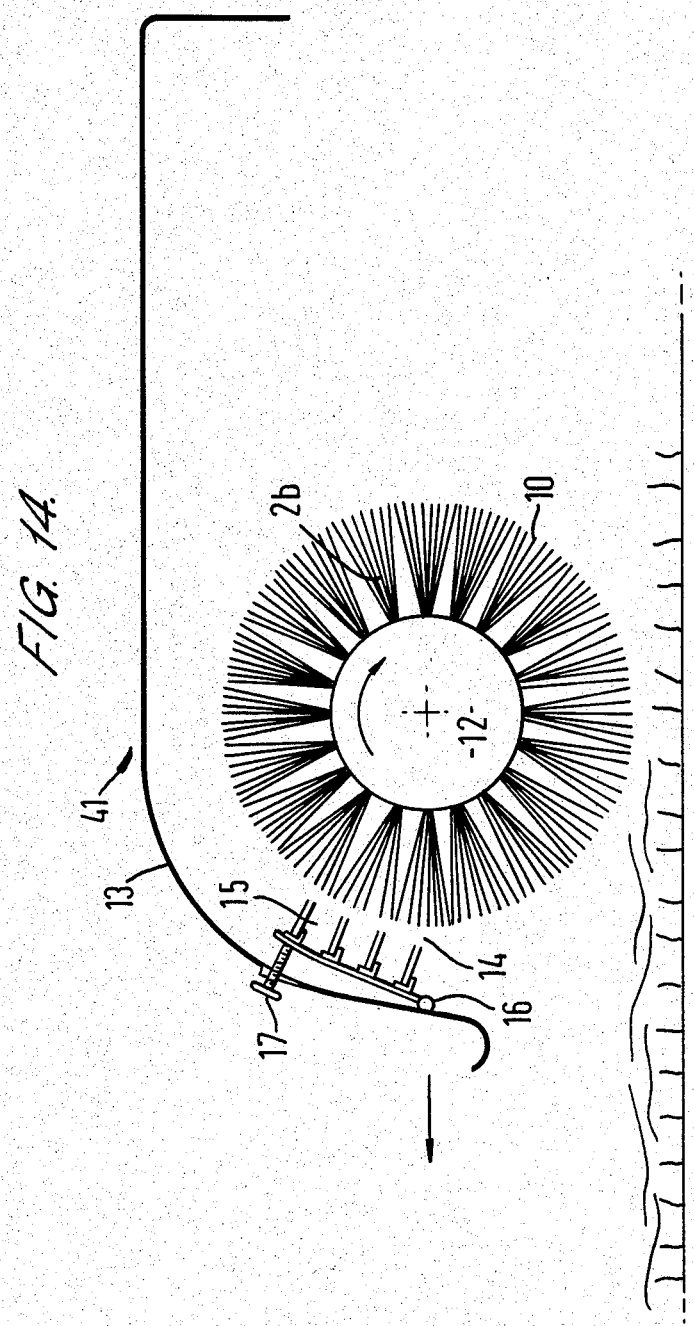

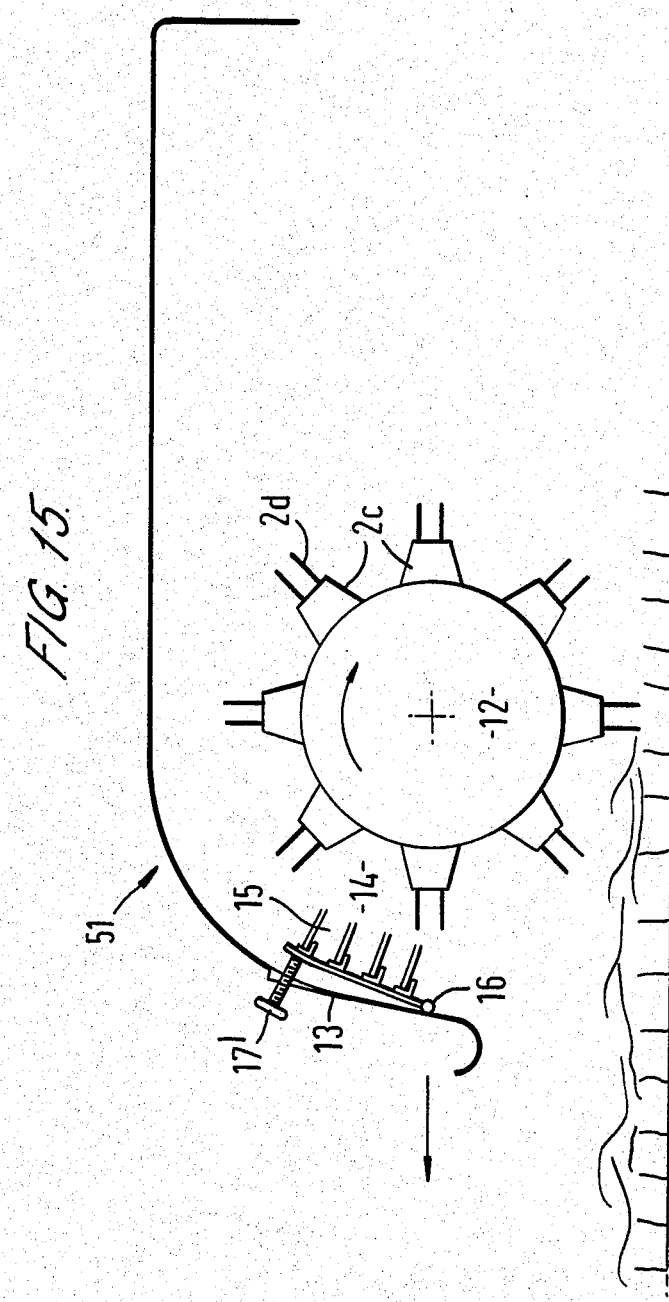

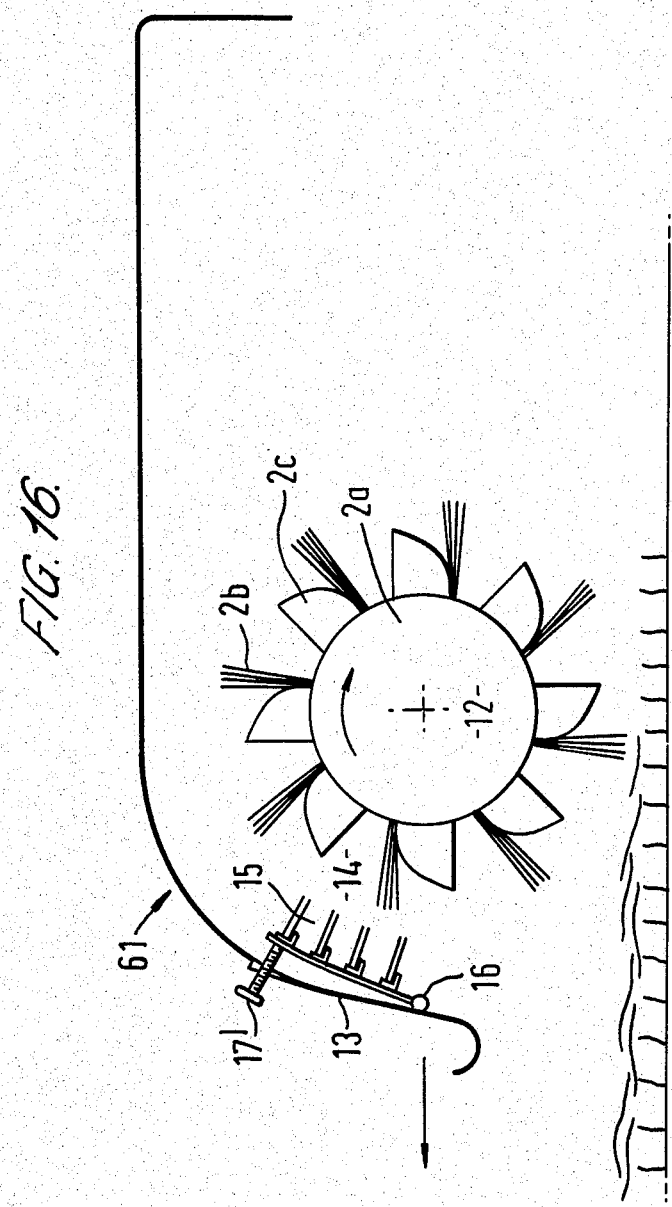

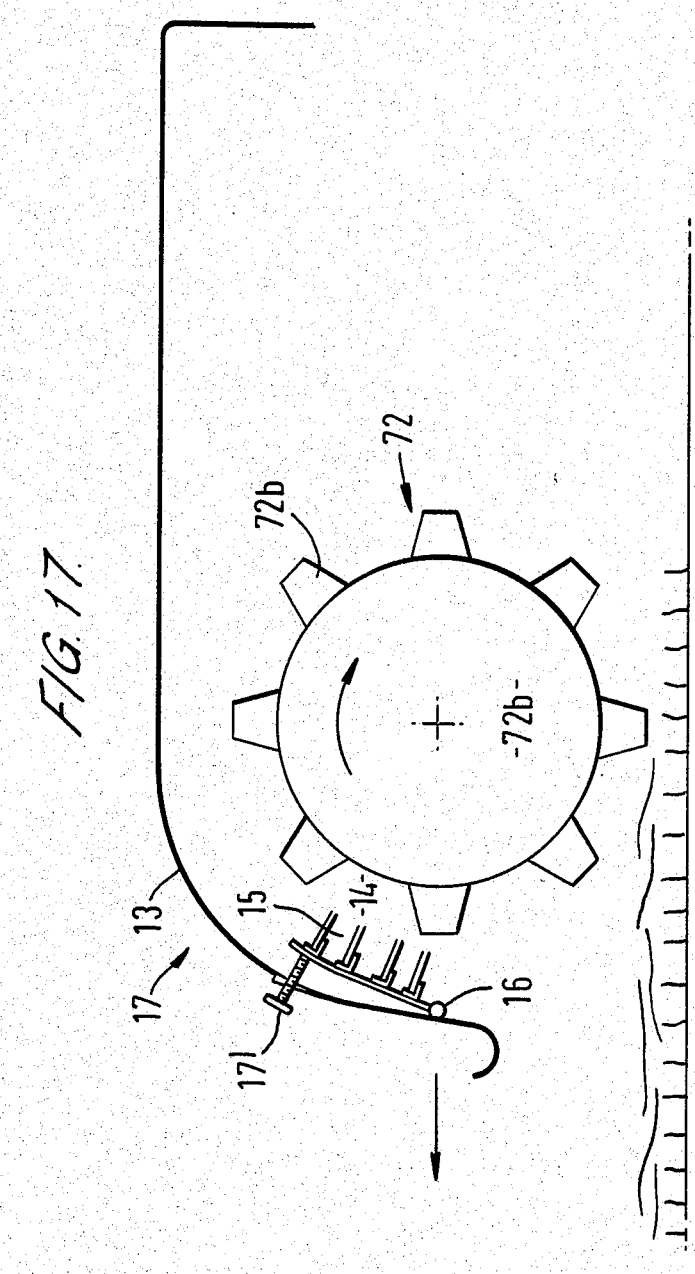

CROP CONDITIONING APPARATUS AND METHOD

This is a continuation, of application Ser. No. 173,136 filed as PCT GB79/00053, Mar. 30, 1979, published as WO 79/00863 Nov. 1, 1979, § 102(e) date Nov. 30, 1979 now U.S. Pat. No. 4,398,384.

The present invention relates to the conditioning of crops especially, but not exclusively, grasses, and provides an improved crop-conditioning apparatus and method.

Forage crops such as grasses which are surplus to immediate requirements are usually cut and field dried to provide animal fodder, particularly hay or silage, for the feeding of animals when fresh forage crops are not available. In temperate, especially maritime climates, the crops are at risk between cutting and harvesting (i.e. the field exposure time) because the adverse effects of light and rain and micro-organism activity can produce appreciable nutrient and dry matter losses. Accordingly, it is important to minimize the field exposure time to reduce the risk of such losses. However, the crops cannot be harvested until they have dried to a sufficiently high dry matter content for safe storage as animal fodder. In the case of hay, a dry matter content of about 80% is usually required.

The speed at which surface and sap moisture evaporate from the cut crop during field exposure depends inter alia on the physical condition of the crop. The principal barrier to moisture loss is the cuticle and the layer of epicuticular wax on the crop surface, and it is now common practice in agriculture to mechanically treat the crop in order to damage this barrier. Such mechanical treatment, which may take the form of crushing, lacerating, bruising, splitting, bending or scuffing the stem and leaves of the crop, is known as "conditioning". A variety of conditioning devices have been used or proposed (e.g. as in UK Pat. No. 588,439 (Chilton), No. 662,303 (Goodall), No. 1,368,682 (Bucher Guyer) and No. 1,322,165 (NRDC) but none are entirely satisfactory. In particular, known conditioning devices often cause undesirable deep tissue damage to the crop, resulting in high dry matter losses; are unsatisfactory (by reason of their complexity, weight and/or cost) for use with crop cutters (i.e. mowing machines) of greater than 3.5 m width; and usually have metal components which are liable to break during use and damage forage harvesters collecting the field dried crop.

Desirably a crop conditioning device should satisfy the following criteria:

1. Minimize fragmentation of the crop;
2. Compensate for changing crop density;
3. Limit physical damage to the cuticular barrier to leave the structural strength and resistance to leaching substantially intact;
4. Allow adjustment for conditioning of different crops and for different treatment requirements;
5. Minimize susceptibility to damage by extraneous objects, particularly stones, and to blockage by the crop;
6. Uniformly treat the crop; and
7. Provide a loosely structured swath or windrow having good resistance to settling.

In addition, the device should be relatively inexpensive to manufacture and maintain and readily adaptable to mowing machines of any width.

In a previously constructed experimental crop conditioning implement (of which the inventor named in this application was a co-inventor, and which is described in our published UK Patent Specification No. 1,322,165 with reference to FIGS. 1 to 5 of that specification) a conditioning rotor was provided with conditioning elements which consisted of elongated flat strips of rubber fixedly secured to an inner, tubular rotating member of the rotor. In operation, the conditioning elements were thrown outwardly by centrifugal force to operating positions at an angle to radii of the rotor.

This machine suffered from a number of disadvantages, including the lack of abrasiveness and of penetration into the crop layer of the wide rubber strips, and the considerable power required to drive the rotor at a rate sufficient to maintain the relatively heavy rubber strips in an outwardly directed operating position. Other disadvantages were that when a rubber strip became deflected from its operating position, the restoring effect provided by the material of the rubber strip itself to return the strip to its operative position was small, the return to the operative position being effected mainly by centrifugal force. Consequently, the time taken for the strip to restore to its operative position was significant and during the return time the strip was ineffective for conditioning. Another disadvantage was that under the effect of centrifugal force, the rubber strips lengthened by creep, and fouled the adjacent components of the apparatus. Thus the effective diameter of the rotor was not constant, being unduly diminished by deflection of the strips, and being enlarged in time by creep of the rubber of the strips.

A second embodiment described in our UK Specification No. 1,322,165 sought to alleviate these problems by providing rigid metal flails pivoted to a central rotating member of the rotor. In this case, as mentioned in the specification, the conditioning elements gained their effective resilience by virtue of the pivoting of the flails against centrifugal force, the material of the flails having no resilience at all. In the case of the rubber strips described in the first embodiment of our UK Pat. No. 1,322,165, the material of the strips was yielding in itself, but in both embodiments described in the specification the elements could not be returned to their operative positions without the effect of centrifugal force.

Our published U.S. Pat. No. 3,977,165 (containing much subject matter common with our UK Pat. No. 1,322,165) describes further forms of pivoted flails, and mentions a flail in the form of a flat leaf spring. Advantages are outlined of not relying primarily on restoring conditioning elements to their operative positions by the effect of centrifugal force, but the patent suggests that the solution lies in the use of rigid conditioning elements pivoted to yield in the face of objects more solid than crop, and restored to their operative positions by the use of resilient mountings at or in the region of the pivot, for example by blocks of rubber. Such a solution is made the subject of our published UK Pat. No. 1,493,574, and this solution has found considerable acceptance in agricultural machinery. Despite this acceptable performance, certain problems remain with metal conditioning elements in connection with the weight of the rotor, (especially if used with very wide cutting implements) and the danger to cattle and following machinery of any portions of conditioning elements broken and remaining in the field. It has therefore been found that despite the generally acceptable performance of the conditioning elements set out in our last mentioned patent, there is a requirement for a conditioning rotor of equal or better perfomance, which is lighter and can have the conditioning elements made of materials which do not harm cattle or following machines such as crop harvesting machines if portions of conditioning elements are left in the field after accidental breakage.

It is also known, for example in UK Pat. No. 588,439 (Chilton) and UK Pat. No. 1,368,682 (Bucher Guyer), to provide a conditioning rotor having nonyieldable, outstanding, radial conditioning elements which mesh with a comb or multiple comb structure which is stationary relative to the rotating conditioning elements. The conditioning effected by such intermeshing elements is severe, and consists mainly of fracture and tearing of the crop. Fixed element conditioning rotors also do not have the facility of yielding in the face of objects heavier than crop to avoid breakage. The intermeshing of the comb or combs with the fixed element conditioning rotor of these patents is achieved by arranging the outstanding conditioning elements or spokes of the rotor in an orderly manner leaving a clear path between adjacent rows of spokes around the rotor, the comb or multiple comb structure being arranged to have its teeth interdigitating with the rotating spokes.

It is also known to windrow crop by a rotor having light, spring steel tines, and during this operation some conditioning is effected. The steel tines are yieldable to a degree by virtue of the resilience of the metal, but in normal practice are mounted by pivotal mountings, by coil spring mountings, or by other resilient mountings, in such a manner that the predominant factor in the yieldability of the tine is its pivoting or hinging effect about the mounting at the base of the tine. Such metal tines are known to be liable to break at the base and in such a case the piece of metal in the field is liable to cause damage to cattle or to following machinery. Also where spring steel tines have been used in tedding rotors, the primary function has been tedding i.e. turning and fluffing up the crop, and the degree of conditioning effected has been small. One reason for this is that only a small proportion of the total crop can come into direct contact with the tines.

In an alternative form of conditioning apparatus, (which operates by a different mode of operation from previously described machines), the crop is collected by a conveying reel and fed at speed into a pair of opposed conditioning rotors having the same diameter as each other and being driven in opposite senses but at the same speed as each other. The rotors inflict damage on the crop by compressing the crop between the rotors and crushing and breaking the crop. Such rotors belong to a general class of conditioning devices known as crimping rollers which in some arrangements may for example comprise rubber rollers having longitudinal ridges and edges on the opposed faces of the rollers. In the operation of such a device the crop is presented to the nip of the rotors as a rapidly moving stream of crop, and during the movement of the crop between the rotors there is substantially no relative velocity between the crop passing between the rotors and the faces of the rotors engaging the crop. The conditioning is achieved by compression by the opposed rotor faces, rather than by relative movement between the conditioning rotors and the crop.

It is an object of the present invention to provide crop conditioning apparatus which allows the achievement, at least in its preferred embodiments, of advantages of operation and manufacture over previously known crop conditioning devices, and which, at least in its preferred embodiments, is free of many if not all of the disadvantages of known crop conditioning apparatus.

According to the present invention in its broadest apparatus aspect, there is provided crop conditioning apparatus comprising a frame having a passage for crop to be conditioned, a crop conditioning device for engaging crop passing through the crop passage and for conditioning the crop by relative movement between the conditioning device and the crop engaged by the device, the conditioning device having a multiplicity of stiff, resilient, elongated conditioning elements for conditioning the crop during the said relative movement by an action consisting predominantly of surface damage to the crop, the elements being yieldable in response to engagement with the crop and being yieldable at least predominantly by bending of the elements along at least part of the crop engaging portions of the lengths thereof, and the elements being sufficiently stiff to return to their undeflected dispositions when free from engagement with crop at least predominantly by virtue of the stiffness of the elements.

Hereinafter, where reference is made to a 'conditioning device as hereinbefore defined' there is meant a conditioning device having a multiplicity of stiff, resilient, elongated conditioning elements for conditioning the crop by relative movement between the crop and the conditioning device by an action consisting predominantly of surface damage to the crop, the elements being yieldable in response to engagement with the crop, and being yieldable at least predominantly by bending of the elements along at least part of the crop engaging portions of the lengths thereof, and the elements being sufficiently stiff to return to their undeflected dispositions when free from engagement with crop at least predominantly by virtue of the stiffness of the elements.

Where reference is made to the elements being sufficiently stiff to return to their undeflected dispositions at least predominantly by virtue of the stiffness of the elements, it is to be appreciated that the base of an element may be secured to a support member of the conditioning device by a mounting which has itself a degree of resilience, for example by being clamped to a support member by clamping means including resilient material. Such a resilient mounting may contribute to the return of an element to its undeflected disposition, but it is a feature of the present invention that the elements are sufficiently stiff to return to their undeflected dispositions predominantly by virtue of the stiffness of the elements. Where, as will be described hereinafter, the elements are mounted in tufts with a plurality of elements set closely together, it will be appreciated that adjacent elements will assist each other in the return to an undeflected disposition when free from engagement with crop, but again it will be appreciated that this return is effected predominantly by virtue of the stiffness of the elements. Similarly where, as will be described hereinafter, the conditioning device comprises a rotary device, the return of the elements to their undeflected dispositions may be assisted by the effects of centrifugal force, but again the elements are returned predominantly by virtue of the stiffness of the elements.

It is to be appreciated that the conditioning apparatus set out above is distinguished from the previously known kinds of conditioning apparatus by various features. The apparatus of the present invention is distinguished from the rubber flails described in our published UK Pat. No. 1,322,165 inter alia in that the elements of the present conditioning apparatus are sufficiently stiff to be returned to their undeflected positions without relying upon centrifugal force as was the case with the rubber flails. This affords, at least in preferred embodiments, the advantage of a swifter return to operative positions by the elements, and a lighter construction of rotor (where the present invention has its conditioning device in the form of a rotor). It is also preferred that the dimensions and stiffness of the elements of the present invention are sufficient for the elements to penetrate at least partly into a stream of crop passing through the passage to produce a more effective conditioning of the crop. The rubber flails described in our previously published patent produced their conditioning effect predominantly by multiple blows from the outer edges of the flat rubber flails, and the rubber flails did not penetrate to any significant extent into the crop. Furthermore, the flat leaf spring mentioned in our U.S. Pat. No. 3,977,165 would produce fragmentation (i.e. chopping and breaking) of the crop and would not condition by an action consisting predominantly of surface damage to the crop (as opposed to fragmentation).

The present invention is distinguished from the second embodiment of our UK Pat. No. 1,322,165 and from our subsequent UK Pat. No. 1,493,574 inter alia in that the elements of the present invention are yieldable in response to engagement with the crop, and are yieldable predominantly by bending of the elements. In the case of the previous apparatus the rigid conditioning elements are yieldable by pivoting rather than bending, and are arranged to give significant yielding only in the face of meeting an object more substantial than the crop. It has not been the practice in previous conditioning apparatus deliberately to provide for yielding of the conditioning elements during the normal conditioning process, but such yielding that has been included has been provided for the purpose of avoiding damage by stones and the like. The yielding provided by the present invention does indeed reduce damage by allowing yielding from stones and the like, but the yielding of elements in the present invention has also for its purpose the providing of more effective conditioning during the said relative movement of the conditioning device and crop.

The engagement of the yieldable elements with the crop preferably conditions the crop by abrading the surface of the crop without otherwise substantially damaging the crop. In particular, the crop preferably receives neither deep tissue damage nor is it usually severely crushed. Accordingly, the extent to which the elements are yieldable will be chosen in any particular case having regard to these requirements.

The present invention is distinguished from previously known machines such as described in the aforesaid UK Pat. No. 588,439 (Chilton) and No. 1,368,682 (Bucher Guyer) inter alia in that these machines have rigid, non-yielding outwardly directed spokes on the rotors thereof, with consequent likelihood of breakage and other damage. Furthermore these fixed spoke rotors inflict a relatively severe conditioning treatment, whereas the elements of the present invention are yieldable in response to engagement with the crop and avoid severe damage to the crop.

The present invention is distinguished inter alia from known tedding rotors which use spring steel tines, in that in these previous devices the tines are mounted resiliently so that the yieldability of the tines is predominantly by hinging or pivoting about the resilient mounting of the tines. This is in contrast to the present invention where the elements are yieldable predominantly by bending of the elements along at least part of the crop engaging portions of the lengths of the elements.

There will now be set out a number of different aspects of the present invention and a number of preferred and optional features of the invention.

In accordance with a first main aspect of the invention, there may be provided crop conditioning apparatus comprising a frame having a passage for crop to be conditioned, a conveying means for conveying crop through the said passage by driven movement of the conveying means relative to the frame, and crop flow modifying means for engaging crop passing through the passage and for accelerating or retarding the crop relative to the conveying means, at least one of the said conveying means and the said crop flow modifying means being constituted by a crop conditioning device for engaging crop passing through the crop passage and for conditioning the crop by relative movement between the conditioning device and the crop engaged by the device, the conditioning device having a multiplicity of stiff, resilient, elongated conditioning elements for conditioning the crop during the said relative movement by an action consisting predominantly of surface damage to the crop, the elements being yieldable in response to engagement with the crop, and being yieldable at least predominantly by bending of the elements along at least part of the crop engaging portions of the lengths thereof, and the elements being sufficiently stiff to return to their undeflected dispositions when free from engagement with crop at least predominantly by virtue of the stiffness of the elements.

In some preferred arrangements, at least one of the conveying means and the crop flow modifying means is a rotary device, and preferably both said means are rotary devices. In some arrangements the crop flow modifying means may comprise restraining means mounted to be stationary in operation relative to the frame for restraining movement of the crop through the passage.

In a preferred form of the first main aspect of the invention set out above, the said conveying means and the said crop flow modifying means may each be constituted by a conditioning device as hereinbefore defined. Thus, in this preferred form of the said one aspect of the invention there may be provided crop conditioning apparatus comprising a frame having a passage for crop to be conditioned, a conveying means for conveying crop through the said passage by driven movement of the conveying means relative to the frame, and crop flow modifying means for engaging crop passing through the passage and for accelerating or retarding the crop relative to the conveying means, the said conveying means and the said crop flow modifying means being constituted respectively by first and second crop conditioning devices each for engaging crop passing through the crop passage and for conditioning the crop by relative movement between the conditioning device and the crop engaged by the device, each conditioning device having a multiplicity of stiff, resilient, elongated conditioning elements for conditioning the crop during the said relative movement by an action consisting predominantly of surface damage to the crop, the elements being yieldable in response to engagement with the crop, and being yieldable at least predominantly by bending of the elements along at least part of the crop engaging portions of the lengths thereof, and the elements being sufficiently stiff to return to their undeflected dispositions when free from engagement with crop at least predominantly by virtue of the stiffness of the elements. In such arrangements, it is thus preferred that relative movement occurs between the crop and both the conditioning devices, and that conditioning is effected by both types of crop relative movement. Also again it is preferred that at least one of the conveying means and the crop flow modifying means is a rotary device, most preferably both the crop flow modifying means and the conveying means being rotary devices positioned substantially opposite each other on opposed sides of the crop passage and arranged to be driven in a manner such as to produce at opposed portions of the rotary devices different linear speeds and/or directions of movement of the perimeters of the two rotary devices. It is to be appreciated that the crop flow modifying means and the conveying means need not be exactly opposite each other, but may for example be offset from each other along the general direction of movement of the crop. It will also be appreciated that, for example, different linear speeds of the perimeters can be achieved for the same angular speed of rotation by having rotary devices of different diameters. Also by way of example different linear velocities may be achieved by having the said perimeters rotating at the same linear speed as each other but in opposite linear directions at a region at which the perimeters are opposite each other.

In another preferred arrangement where both the crop conveying means and the crop flow modifying means are constituted by conditioning devices as hereinbefore defined, the crop flow modifying means comprises restraining means mounted to be stationary in operation relative to the frame for restraining movement of the crop through the passage.

In accordance with a second main aspect of the invention there may be provided crop conditioning apparatus comprising a frame having a passage for crop to be conditioned, first and second crop conditioning devices each for engaging crop passing through the crop passage and for conditioning the crop by relative movement between the conditioning device and the crop engaged by the device, the first and second conditioning devices being positioned on opposite sides of the passage and at least one of the said first and second conditioning devices being mounted for driven movement such as to produce along the general direction of crop flow through the passage relative movement between the crop engaging portions of the first conditioning device and the crop engaging portions of the second conditioning device, each conditioning device having a multiplicity of stiff, resilient, elongated conditioning elements for conditioning the crop during the said relative movement by an action consisting predominantly of surface damage to the crop, the elements being yieldable in response to engagement with the crop, and being yieldable at least predominantly by bending of the elements along at least part of the crop engaging portions of the lengths thereof, and the elements being sufficiently stiff to return to their undeflected dispositions when free from engagement with crop at least predominantly by virtue of the stiffness of the elements. In this second aspect of the invention, it is preferred that the said conditioning devices are rotary devices arranged to be driven in a manner such as to produce at opposed portions of the rotary devices different linear speeds and/or directions of movement of the perimeters of the two rotary devices.

In accordance with a third main aspect of the invention there is provided crop conditioning apparatus comprising a frame having a passage for crop to be conditioned, a conveying means for conveying crop through the passage by driven movement of the conveying means with relative movement between the crop and the conveying means while the crop passes through the crop passage, the conveying means comprising a crop conditioning device for engaging crop passing through the crop passage and for conditioning the crop by relative movement between the conditioning device and the crop engaged by the device, the conditioning device having a multiplicity of stiff, resilient, elongated conditioning elements for conditioning the crop during the said relative movement by an action consisting predominantly of surface damage to the crop, the elements being yieldable in response to engagement with the crop, and being yieldable at least predominantly by bending of the elements along at least part of the crop engaging portions of the lengths thereof, and the elements being sufficiently stiff to return to their undeflected dispositions when free from engagement with crop at least predominantly by virtue of the stiffness of the elements. In one preferred arrangement the crop passage is formed between the conveying means and a housing extending over the conveying means.

In accordance with one feature of the invention in its broadest apparatus aspect, the apparatus includes a second crop conditioning device, the first and second conditioning devices being positioned substantially opposite each other on opposed sides of the crop passage, and the second crop conditioning device also having a multiplicity of stiff, resilient, elongated conditioning elements for conditioning the crop during relative movement between the elements and the crop by an action consisting predominantly of surface damage to the crop, the elements of the second conditioning device also being yieldable in response to engagement with the crop, and being yieldable at least predominantly by bending of the elements along at least part of the crop engaging portions of the lengths thereof, and the elements of the second conditioning device also being sufficiently stiff to return to their undeflected dispositions when free from engagement with crop at least predominantly by virtue of the stiffness of the elements. Preferably in this arrangement, at least some conditioning elements of opposed conditioning devices are positioned in planes which are common to opposed elements and which are aligned along the general direction of movement of crop through the crop passage. That is to say that where, for example, the two conditioning devices are rotary devices mounted for rotation about horizontal axes, it is preferred that at least some elements of opposed conditioning devices are positioned in vertical planes which are common to opposed elements (i.e. opposed elements lying at least partially in common planes) the planes being aligned along the general direction of movement of the crop through the crop passage.

Where two opposed conditioning devices are provided, the opposed conditioning devices may be arranged with a positive or negative clearance, or with no clearance. That is to say that the conditioning devices may be positioned with the tips of the elements of the opposed devices spaced apart from each other, or with the elements of opposed devices overlapping each other, or with the tips of the elements of the opposed devices substantially abutting one another. The term negative clearance is used where the elements of the two opposed conditioning devices overlap each other during operation. In such an arrangement it will be appreciated that where, as set out above, at least some opposed elements are positioned in planes common to opposed elements and aligned along the direction of crop movement, the elements will mesh together and strike against one another during operation. Where this occurs, it will be appreciated, that in such embodiments of the invention, the invention is further distinguished from previously known fixed spoke conditioning rotors such as disclosed in UK Pat. No. 1,368,682 (Bucher Guyer) and No. 588,439 (Chilton) in that in these previous devices the spokes of the rotor and fingers of the interdigitating comb are never positioned in planes common to the spokes and fingers and aligned along the general direction of movement of the crop through the crop passage, and never strike against each other and intermesh. On the contrary, in the previously known devices the spokes on the rotor were arranged to leave clear paths for the fingers of the comb to intrude into.

In practical embodiments it has been found advantageous for the clearance between the tips of the opposed elements to fall in the range +50 mm to −30 mm, most preferably +30 mm to −20 mm.

There will now be described a number of preferred and optional features of the invention which may be applied in the various aspects of the invention set out above.

It is particularly preferred that the elements are yieldable in directions lying in more than one plane. Thus it is preferred that in operation the main deflection of the elements takes place along the general direction of movement of the crop through the crop passage, but that it is also possible for the elements to deflect sideways relative to the main direction of the crop flow. this is of particular value where there are provided two opposed conditioning devices as hereinabove defined, and the devices are arranged with a negative clearance between opposed elements. The two sets of elements then mesh against each other during conditioning of the crop being passed between the two conditioning devices, and the elements deflect sideways during this meshing.

Where the elements are arranged to be yieldable in directions lying in more than one plane, it is to be appreciated that embodiments of the invention are further distinguished from the rubber strips and flat leaf spring arrangement proposed in our UK Pat. No. 1,322,165 and U.S. Pat. No. 3,977,165, respectively, in that these conditioning elements would not be capable of providing significant yielding in directions lying in more than one plane.

It is preferred that the said relative movement between various components of the conditioning apparatus and the crop should be produced along the general direction of movement of the crop through the passage. However it will be appreciated that, as will be described hereinafter, the apparatus may be arranged so that some transverse movement of the crop is arranged relative to the general direction of movement through the passage.

It is preferred that the elements of the or at least one of the conditioning devices (where more than one conditioning device is provided) have a population and distribution such that substantially no crop can pass the conditioning device without receiving conditioning treatment by the elements. Although in some arrangements the elements may be provided in a generally uniform distribution across the conditioning device, it will be appreciated that this is not necessary in order to fulfill the previously stated requirements. For example where one conditioning device is a rotary device, the elements may be arranged in groups spaced apart along rows parallel to the axis of the rotor and angularly spaced around the rotor. These rows may each contain gaps through which crop can pass, but the groups of elements can be staggered in position from one row to the next around the rotor so that the gaps in one row are effectively blocked by one or more groups of elements in succeeding rows. Conveniently the groups of elements can be arranged in a spiral pattern, but other patterns may be used. The net effect of this preferred feature is to ensure that as the rotor rotates, no gap is presented to the crop through which the crop can pass without receiving conditioning treatment. Correspondingly where the conditioning device is a stationary device, the device may be formed of a series of comb-like constructions, the gaps in one comb being blocked by the elements of the next succeeding comb, in which the elements or groups of elements are offset from comb to comb so that no continuous gap is presented overall to the crop for the crop to escape through.

In a particularly preferred form of the or at least one of the conditioning devices the conditioning device comprises a brush in which the elements are arranged in an array extending both transverse to and along the general direction of crop movement through the passage. Conveniently the elements may be arranged in a brush of conventional form, that is to say in which groups of elements are mounted together in tufts, and the positions of the tips of the elements are to at least some extent random. However other forms of brush will readily be apparent, and in particular the brush may comprise elements which are disposed in a regular, non-random, pattern.

In accordance with other features of the invention which will be described more fully hereinafter, it is preferred that the elements are sufficiently stiff to penetrate and move through at least part of a stream of crop moving through the passage. It is also preferred that the elements condition the crop by an action which consists predominantly of surface abrasion of the crop. It is further preferred that the elements are yieldable by bending substantially along the whole of the free lengths thereof.

In one form, the tips of the elements may be distributed substantially uniformly and the population of the elements at the tips may lie in the range 1 to 20 elements per sq.cm., preferably in the range 4 to 16 elements per sq.cm. In another form the elements may be arranged in spaced-apart tufts of elements and the population of the elements in each tuft at the tips may lie in the range 1 to 20 elements per sq.cm., preferably in the range 4 to 16 elements per sq.cm.

Conveniently each tuft may be formed of one or more lengths of element material doubled over and secured to a supporting base in the region of the fold of the doubled over element length or lengths. Alternatively the conditioning elements may be constructed by moulding or otherwise preforming plastics or other resilient material.

Also conveniently each element or group of elements in a tuft may be supported and protected at the base thereof by a sleeve of resilient material. Such a sleeve may provide a resilient mounting for the elements such as has already been referred to.

In order to reduce the risk of the elements being dislodged or breaking in use, it may be convenient in some arrangements that their bases are protected by respective shrouds against impact by material, especially extraneous material such as stones. The shroud suitably can be constituted by an upstanding wall located forwardly (with respect to the movement of the crop relative to the element) of the respective element or element row and projecting for only the lower part of the element length. It is also advantageous to provide in some circumstances a support rearwardly (with respect to the movement of the crop relative to the element) of the respective element or element row to limit the extent to which the element can bend and thereby reduce the risk of fatigue. Said support can readily be provided by an upstanding wall constituting a shroud for the next following element or element row. In addition or alternatively to the provision of a support to limit element bending, there can be provided stone guards having orifices or recesses to receive respective elements or tufts on limited bending of the latter whilst deflecting stones and other extraneous lumps of matter.

As has been mentioned there are a number of different configurations of the brush which can be used. In some arrangements the conditioning device may have a plurality of parallel element rows extending laterally, particularly substantially perpendicularly, to the direction of relative movement between the crop and the elements. Where the elements or element tufts are spaced apart, the spacing may be, for example, 20 to 50 mm, especially 40 to 130 mm.

As has been explained, the yieldability of the elements depends chiefly on the conditioning action required, and by way of example, the yieldability of an element may be such that application of a load of 125 grams at the tip of the element produces a displacement of the tip of about 3 mm when the element has a free length of 75 mm, and a displacement in the range 6 to 10 mm, preferably about 8 mm, when the free length is 100 mm.

The elements can be bristles or rods having, for example, a circular cross-section and a diameter in in the range 2 mm to 8 mm, especially 3 mm to 6 mm. The elements can be of solid or hollow circular or other cross-sectional shape e.g. triangular, rectangular or square, but the presently preferred cross-section is trilobate (i.e. clover leaf or trefoil shape). The elements, especially those of a smaller diameter, can be crimped in order to increase their stiffness and/or can be bunched together to form tufts, as has been mentioned. Conveniently the free bendable length of each element lies in the range 10 to 300 mm, preferably in the range 25 to 250 mm and most preferably in the range 75 to 125 mm. Within each bunch the length and stiffness of the elements may differ, to extend the conditioning effect into different crop layers and graduate the severity of treatment and the rate at which crop is conveyed.

A preferred range of element cross-sections can conveniently be described by a feature that the ratio of the sides of a rectangular envelope containing a cross-section of an element does not exceed 4 to 1, preferably not exceeding 2 to 1. Another criterion which can be used to establish suitable element dimensions, is that the maximum cross-sectional dimension of an element is preferably in the range 1 to 20 mm, preferably to 3 to 10 mm.

Where the or a conditioning device comprises a rotary conveying device, it is preferred that there is provided drive means for driving the rotary conveying rotor at a rotational speed of 400 to 1700 r.p.m., most preferably 500 to 1000 r.p.m.

A particularly important preferred feature is that with a rotary conveying device there is provided drive means for driving the rotary conveying device at a rotational speed such as to provide a tip velocity of 10 to 50 m per second at the tips of the elements, most preferably a velocity in the range 20 to 30 m per second, especially a velocity of 24 m per second. Conveniently such a rotary conveying device has a diameter in the range 350 to 700 mm, especially 450 to 600 mm.

The elements can be formed of any suitable materials, especially synthetic materials such as plastics materials. Plastics materials are preferred because detached or broken elements left in the field or in the crop are less likely to injure livestock should any animal ingest them. Suitable plastics materials include polypropylene and nylon. However in general suitable materials comprise nylon, polypropylene, glass fibre, or carbon fibres, either alone, or when impregnated, studded, layered or tipped with metallic or mineral abrasives, including for example silicon carbide.

The said frame of the apparatus of the invention may be stationary, but more usually the said frame is a mobile frame mounted for movement over the ground and the apparatus is arranged for collection of crop during movement of the frame over the ground and for depositing of conditioned crop onto the ground after the conditioning action. Where a mobile frame is used, the or at least one of the conditioning devices may be arranged to pick up previously cut crop lying on the ground, or alternatively the apparatus may include cutting means for cutting crop growing on the ground, the apparatus being arranged for the or at least one of the conditioning devices to engage crop cut by the cutting means.

One particularly advantageous arrangement of the invention occurs where the or one of the conditioning devices constitutes a crop conveying means, and the cutting means operates by linear unidirectional movement of cutting elements over the major portions of their cutting paths. Such a cutting means can be provided by a belt or chain cutter in which a belt or chain rotates continuously around two spaced-apart pulleys, and between the pulleys presents to the crop a unidirectionally moving belt or chain carrying cutting knives in a single direction across the path of forward movement of the cutter. In such an arrangement it is an advantageous feature of the invention that the conditioning device can be arranged to grip growing crop and to tension the crop against the cutting means during the cutting operation. Such gripping can be made to be far more effective with the yieldable elements of the present invention, than with previously known spoke or flail conditioning rotors.

Where there is provided cutting means of the type set out in the preceding paragraph, there may also be provided an advantageous feature of the present invention by arranging circumferentially successive elements of the rotary conveyor conditioning device in a helical formation in a sense such as to exert on the crop a movement along the axis of the rotary conveying means opposed to the cutting direction of the said cutting elements.

Returning to consideration of arrangements in which the or one of the conditioning devices comprises a stationary crop flow modifying means, for example a brush, the means concerned is stationary in use but preferably is adjustable in position to facilitate the treatment of different crops and/or variation of the extent of conditioning provided. Conveniently the means concerned is spring loaded to automatically adjust to variations in crop flow rate and reduce the risk of blockage of the conditioning device by the crop or extraneous material and damage by stones or other lumps of extraneous material. When said stationary means comprises a brush, this can be inclined in the longitudinal direction of the passage, and the length of elements in successive rows can be varied, to progressively increase or decrease the resistance offered to the movement of the crop through the passage. Said brush can also be pivoted and supported in such a way that increased bulk of crop entering at the front forces the leading edge of the brush away from the conveying means, but, through mechanical advantage, forces the trailing edge to close up. Drastic variations in crop flow are evened out by excess crops being held back momentarily in front of the leading edge.

When the crop is conveyed through the passage by a rotary conveyor, the stationary brush preferably is arcuate at the tips of the elements to conform with or substantially complement the curvature of the conveyor. It is much preferred that the stationary brush should constitute the restraining means of the preferred embodiment previously defined and that the conveying means of said embodiment should be constituted by a rotary brush as previously described. The clearance between the stationary brush and the rotary conveyor usually will be positive (i.e. there will be a gap between them) but, in appropriate circumstances, can be zero or negative (i.e. the stationary brush elements will abut or overlap at least the radially outermost parts of the rotary conveyor).

Referring to the preferred embodiment previously defined it is especially preferred that the conveying means is a rotary brush as previously described. As mentioned above, it is preferred that the restraining means should be a stationary multielement brush. However, other forms of restraining means can be employed. Said other restraining means can comprise, for example, a plate, especially having a serrated distal edge, protruding into the passage or a second rotary brush of the kind previously described. If a second rotary brush is employed it can be driven in the same or opposite sense to the conveying rotary brush e.g. at a significantly different angular velocity to provide a significant velocity difference at the element tips. An additional stationary brush or brushes may be provided to even out the crop stream. Stationary "V"-shaped tines of the kind disclosed in UK Patent Specification No. 1,322,165 or combs can be employed as alternative forms of said restraining means.

A guide means defining the crop passage conveniently is provided by a hood or housing enclosing the aforementioned conditioning components of the device at least along the path of the crop.

The crop conditioning device of the invention can be located at a stationary crop conditioning location, for example, in a plant for artificially drying crops. In this case, the cut crop would be harvested immediately after cutting or after only limited field drying and then transported to the plant for further drying. The cut crop would be passed through the conditioning device before passage through a drier. More usually however, the crop conditioning device would be employed in the field to condition the crop immediately or shortly after cutting. Accordingly, it is preferred that the device comprises a frame adapted to be moved translationally over the ground. Conveniently, the frame can be a wheeled frame, although the frame can be provided with other ground-engaging means, for example skids, if desired. The frame can be self-propelled or mounted on or towed by a tractor or other vehicle. Alternatively the frame can be fully mounted or semi-mounted on a tractor. The drive for the driven parts of the device such as a conveying rotary brush usually will be provided from a power take-off from the engine providing motive power for the frame or the vehicle.

When a mobile crop conditioning device of the invention has a conveying rotary brush, said brush can be adapted to pick up cut crop from the ground. Other means of picking up the crop can be provided if desired or required. However, the mobile crop conditioning device preferably is included in a combined mower-conditioner in which a crop cutter device cuts the crop and immediately delivers it to the crop conditioning device for conditioning and subsequent discharge onto the ground in a swath or windrow. The brush mechanism of the crop conditioning apparatus is particularly suitable for inclusion in such a combined mower-conditioner in that it can be constructed in a relatively lightweight and simple manner at a width tailored to suit any mower and provides a loosely structured swath or windrow with good resistance to settling. Any type of cutter device, including drum, disc, belt and reciprocating bar cutters, can be employed subject only to providing a cut crop capable of being conditioned by the crop-conditioning device.

There is also provided in accordance with the present invention a method of conditioning crop comprising the steps of causing surface damage to the crop by producing relative movement between the crop and a conditioning device having a multiplicity of stiff, resilient, elongated conditioning elements which are yieldable in response to engagement with the crop and are yieldable at least predominantly by bending of the elements along at least part of the crop engaging portions of the lengths thereof, the method including the return of the elements to their undeflected dispositions when free from engagement with crop at least predominantly by the effect of the stiffness of the elements.

In accordance with one aspect of the method according to the invention, the method includes the steps of conveying crop through a passage by driven movement of a crop conveying means relative to the frame, and accelerating or retarding the crop relative to the conveying means by a crop flow modifying means, the elements being provided on either or both of the conveying means and the crop flow modifying means.

In accordance with another aspect of the method according to the present invention and method includes the steps of passing the crop through a passage and conditioning the crop by relative movement between the crop and said crop conditioning elements which are positioned in arrays substantially opposite each other on opposed sides of the crop passage.

In accordance with a yet further aspect of the method according to the invention, the method includes the steps of conveying crop through a passage by movement of said elements with a degree of slippage between the crop and the elements to provide relative movement between the elements and the crop. In a preferred form of this arrangement the method includes the step of conveying the crop past a crop flow modifying means for producing or enhancing slippage between the crop and the elements.

In accordance with the preceding aspects of the method of the invention, it is preferred that there is included the step of producing a rotary movement of the elements for the purpose of conveying the crop and/or producing relative movement between the crop and the elements.

Also it is preferred that the method includes conditioning the crop by an action in which the elements penetrate and move through at least part of a stream of crop passing through the crop passage and condition the crop predominantly by surface abrasion of the crop.

It is yet further preferred that the method includes the step of producing relative movement between the conditioning elements and the crop in such a manner as to produce yielding of the elements in directions lying in more than one plane.

Embodiments of the invention will now be described by way of example with reference to the accompanying drawings in which:

FIGS. 5, 6 and 7 show side, end and plan views respectively of a modified form of a tuft of conditioning elements forming a part of the apparatus shown in the preceding Figures;

FIG. 8(c) is a diagrammatic side view of a modification of the apparatus shown in FIG. 8(a) the modification including reversal of rotation of a conditioning rotor shown in the apparatus and addition of a crop stripping and flow diverting rotor;

Figure 1:
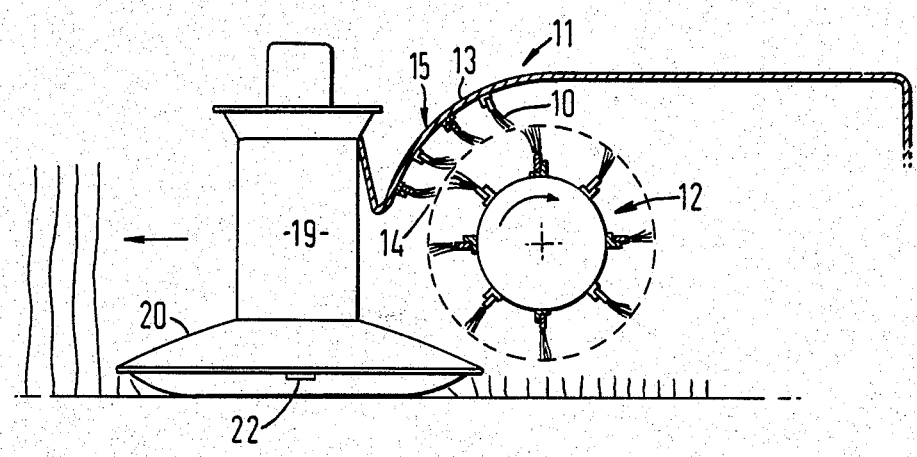
FIG. 1 is a diagrammatic side view of a crop conditioning apparatus embodying the invention.
Figure 9A:
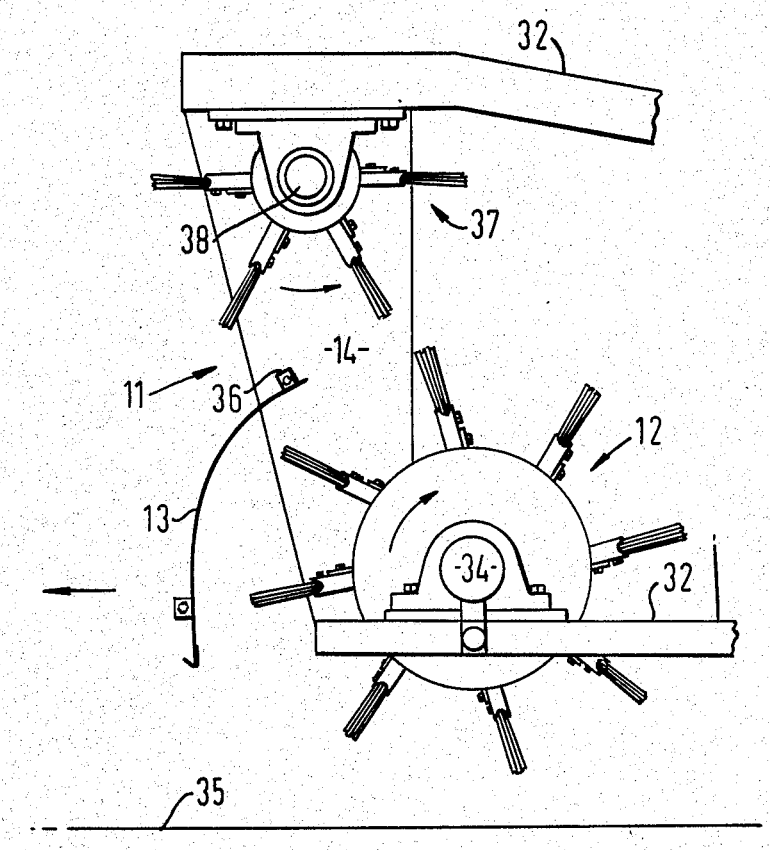
FIG. 9(a) is a side view of a conditioning apparatus embodying the invention including some components previously shown in the aforesaid Figures, but modified by the addition of a second rotary conditioning device.
Figure 9B:
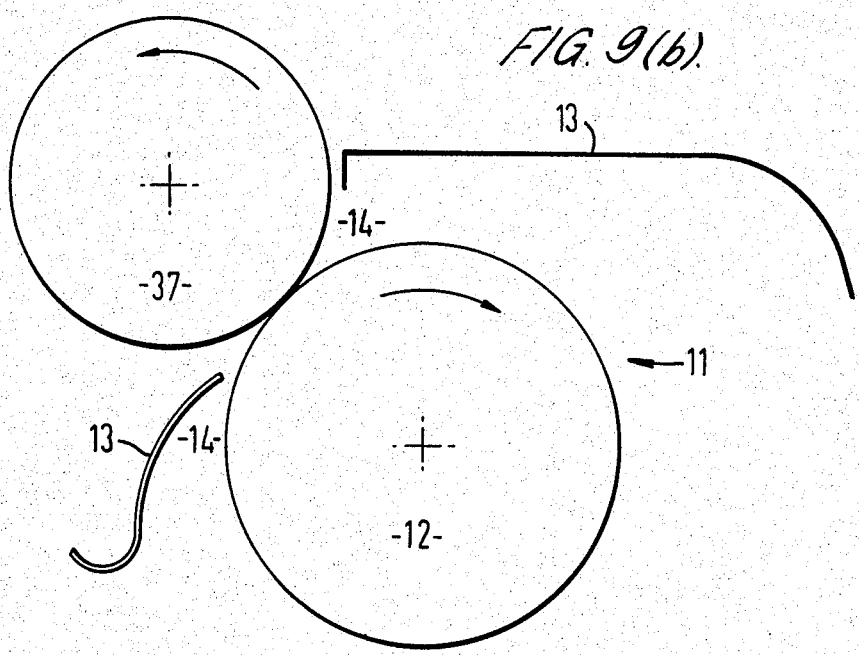
Figure 9C:
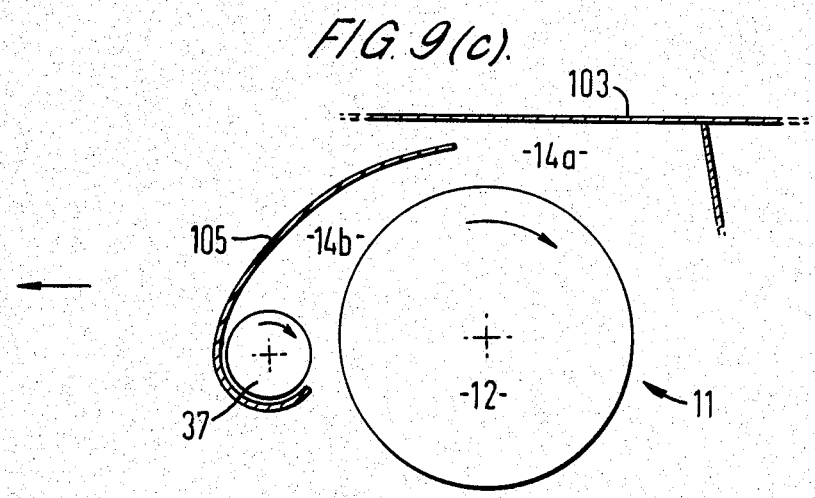
Figure 9D:
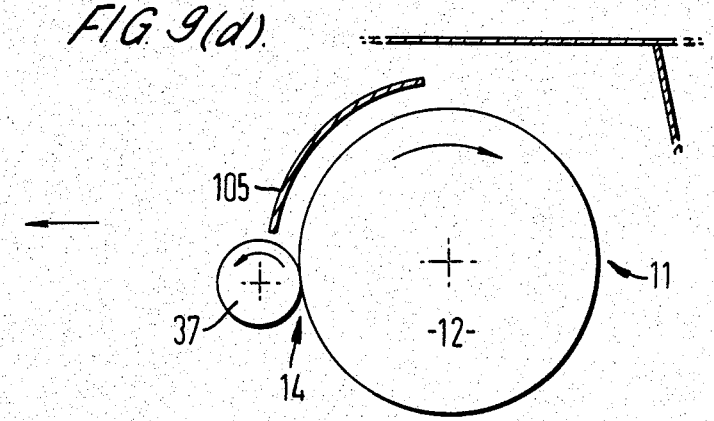
Figure 9E:
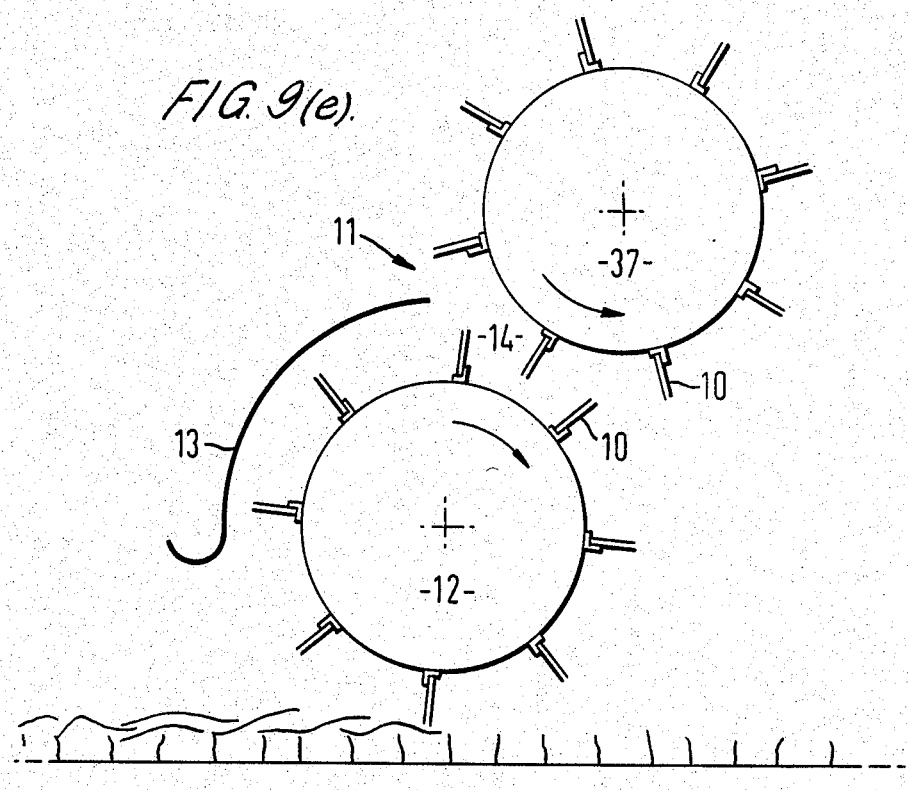
Figure 14A:
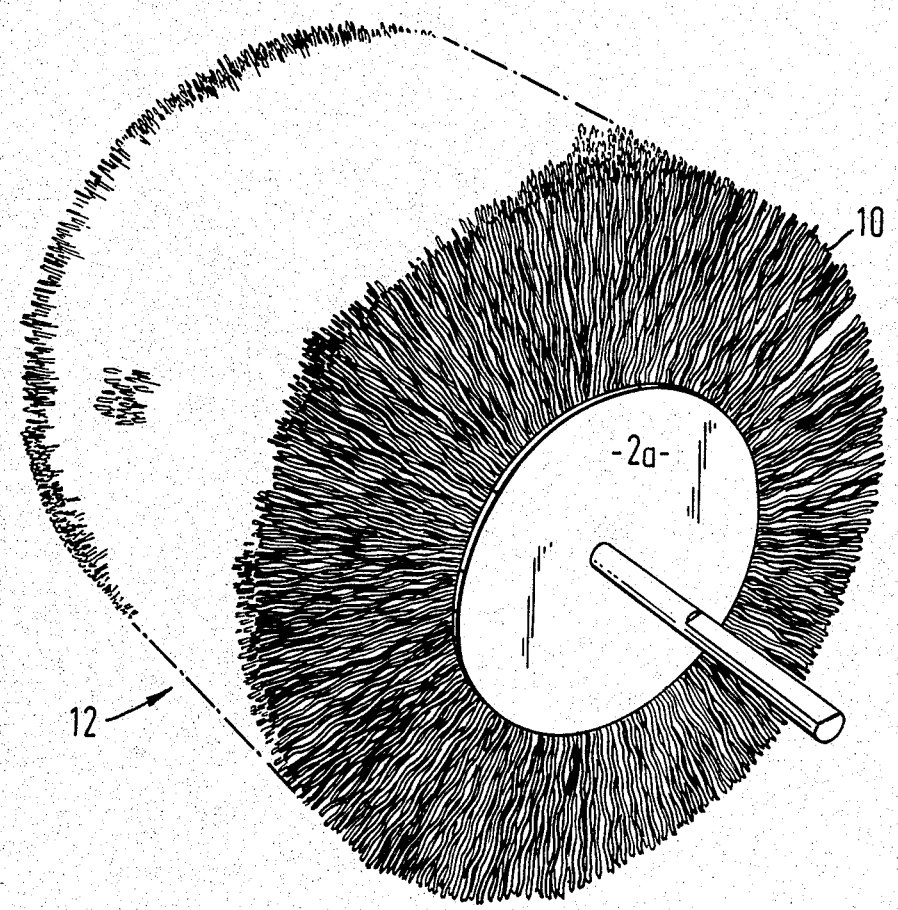
Figure 18:
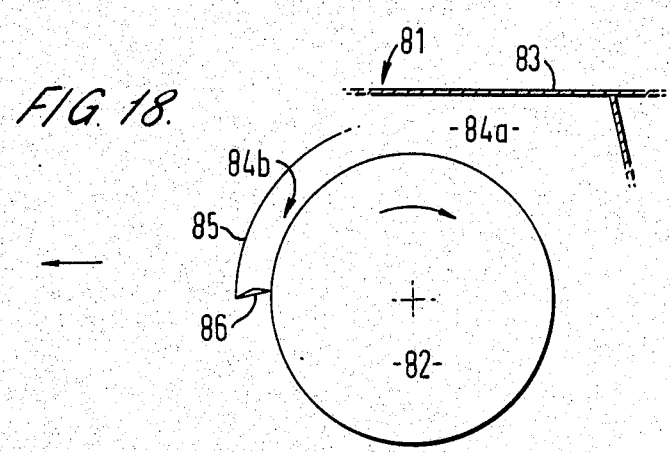
Figure 18A:
Figure 18:
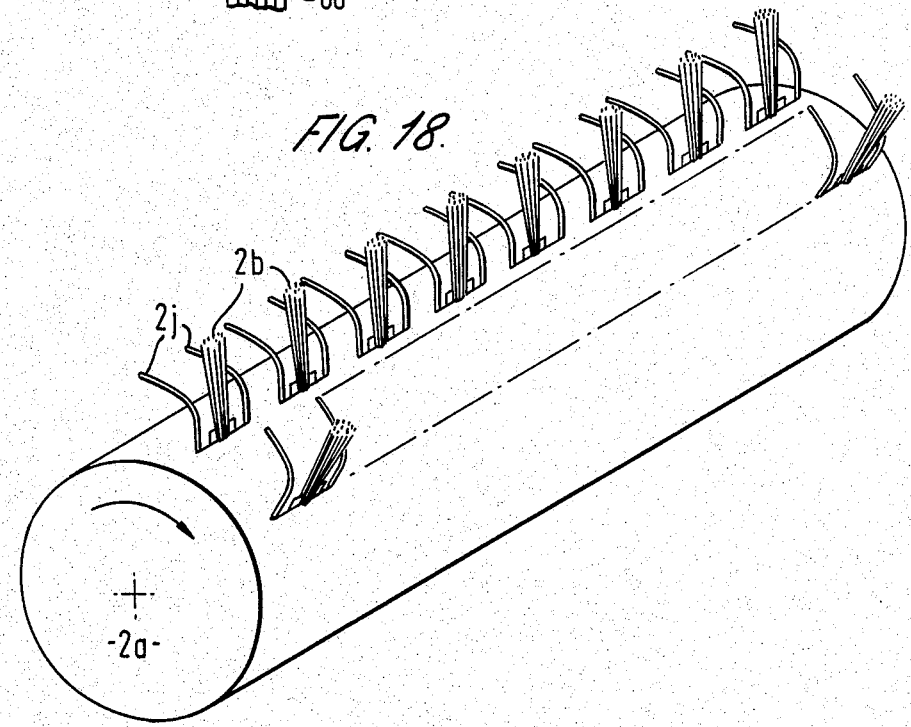
Figure 20:
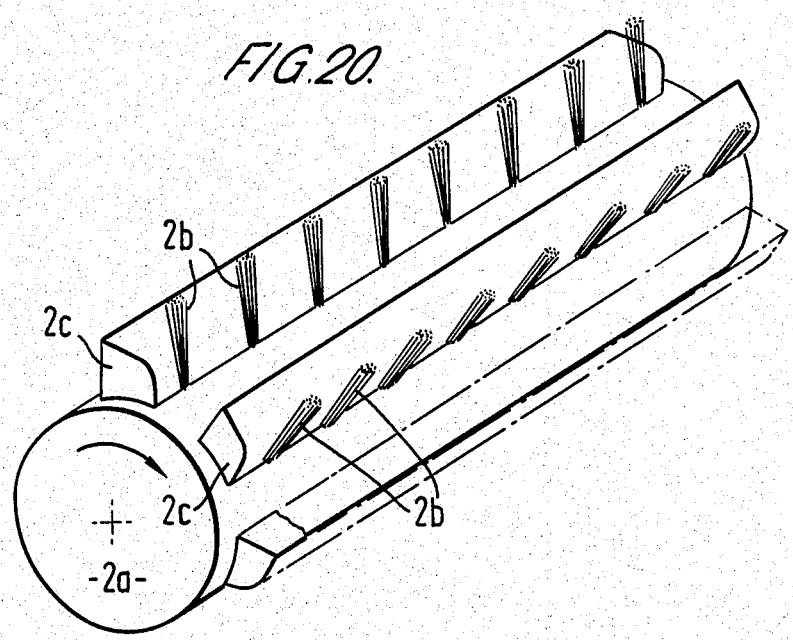
Figure 22:
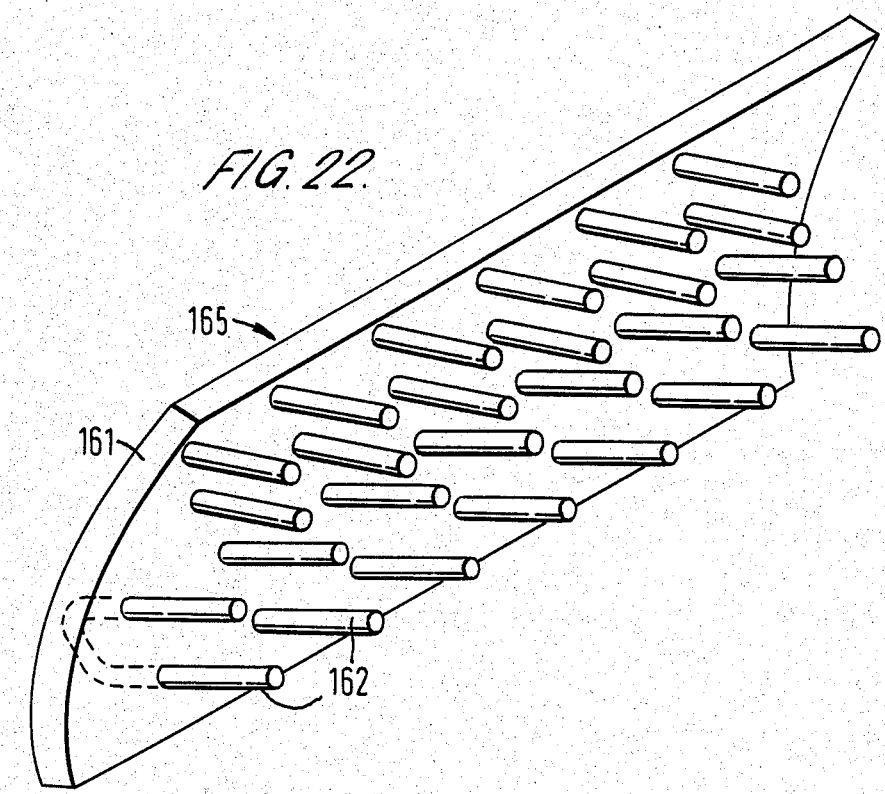
Figure 23:
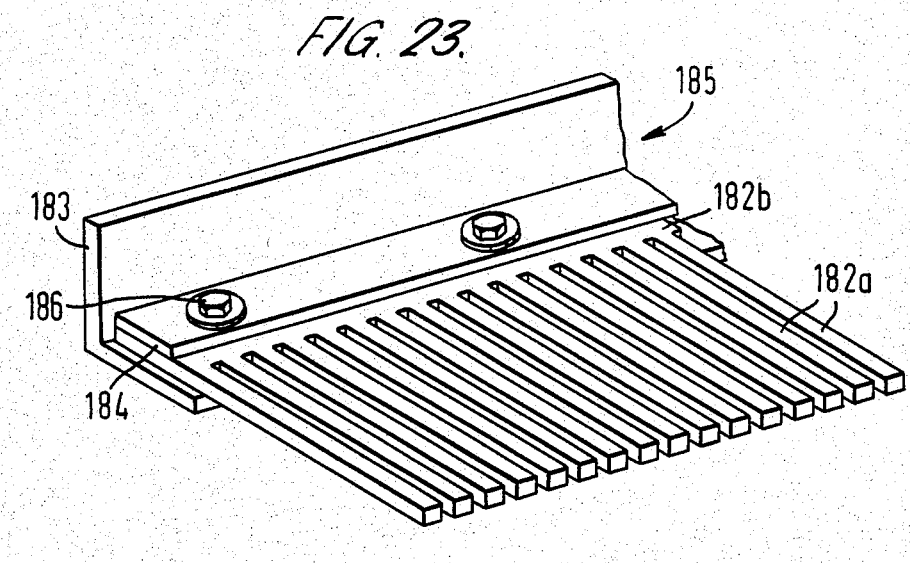

FIGS. 9(b), 9(d) and 9(e) show modifications of the conditioning apparatus shown in FIG. 9(a), in which the position of the second rotary conditioning device is moved and in FIG. 9(c) also has its direction of rotation reversed;

FIGS. 10 and 10(a) are diagrammatic side views of modifications of the conditioning apparatus of FIG. 1, in which disc mowers are used in the apparatus;

FIG. 11 is a diagrammatic side view of a modification of the conditioning apparatus shown in FIG. 1, in which an alternative form of stationary conditioning device is provided;

FIG. 12 is a diagrammatic side view of a modification of the crop conditioning apparatus of FIG. 11 in combination with a disc mower;

FIG. 13 is a diagrammatic side view of a modification of the crop conditioning apparatus of FIG. 12 in combination with a belt mower;

FIG. 14 is a diagrammatic side view of a modification of the crop conditioning apparatus shown in FIG. 1 including a brush having a different construction from that shown in FIGS. 1 to 10;

FIG. 14(a) shows a further slightly modified brush of the same general type as the main pick up rotary brush shown in FIG. 14;

FIGS. 15 to 19 are diagrammatic side views of crop conditioning apparatus of further modified forms embodying the invention, FIG. 18(a) showing a detail of an element of FIG. 18;

FIG. 20 is a perspective view of a rotary brush embodying the invention of a kind suitable for use in the apparatus shown in FIG. 16;

FIG. 21 is a perspective view of a further rotary brush slightly modified from the brush shown in FIG. 20;

FIG. 22 shows an alternative conditioning device suitable for use in the embodiments of the preceding Figures; and FIG. 23 shows an alternative brush part which may be used in combination with further similar brush parts in similar manner to that shown in FIG. 22.

Referring firstly to FIG. 1 there is shown diagrammatically in side view and partly in section, a crop conditioning apparatus in accordance with one preferred embodiment of the invention. The apparatus is indicated generally by the reference numeral 11 and comprises a driven rotary brush indicated generally at 12. The brush 12 is covered by a hood 13 which defines therewith a passage 14 through which cut crop is to be conveyed by the brush 12. An arcuate stationary brush indicated generally by the reference numeral 15 is secured to the underside of the hood 13 and extends along the passage 14 to restrain the crop flow therethrough.

Each of the brushes 12 and 15 embodies a conditioning device as hereinbefore defined and comprises rows of stiff, resilient, elongated conditioning elements 10 which in the following description will be referred to as brush filaments. The brush filaments 10 may for example be made of polypropylene or nylon, and are yieldable generally in the longitudinal direction of the passage 14 but also in response to forces from other directions. In the case of the rotary brush 12, the filaments 10 will yield at least in the anticlockwise sense as viewed in the Figure when the brush is rotated in the direction of the arrow as shown. The filaments of the stationary brush 15 will yield at least in the opposite sense when viewed in the said direction.

As will become apparent, the brushes 12 and 15 can each be formed in a number of alternative arrangements as will be described hereinafter, but for the sake of simplicity the embodiment will firstly be described with the brushes 12 and 15 constructed in the same manner.

Figure 2:
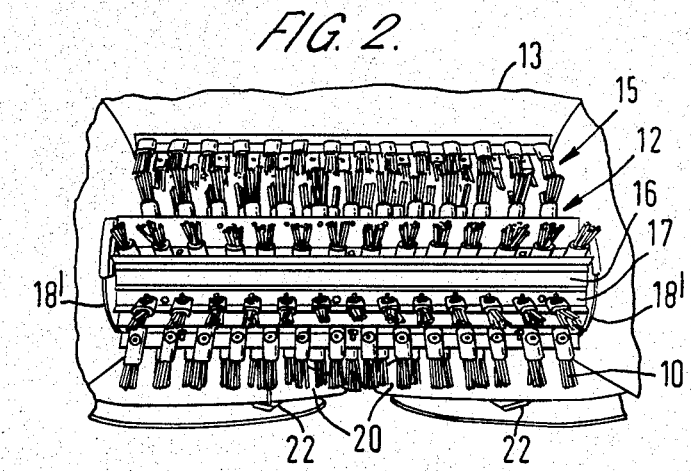
FIG. 2 is a rear view of the conditioning apparatus shown in FIG. 1.
Figure 3:
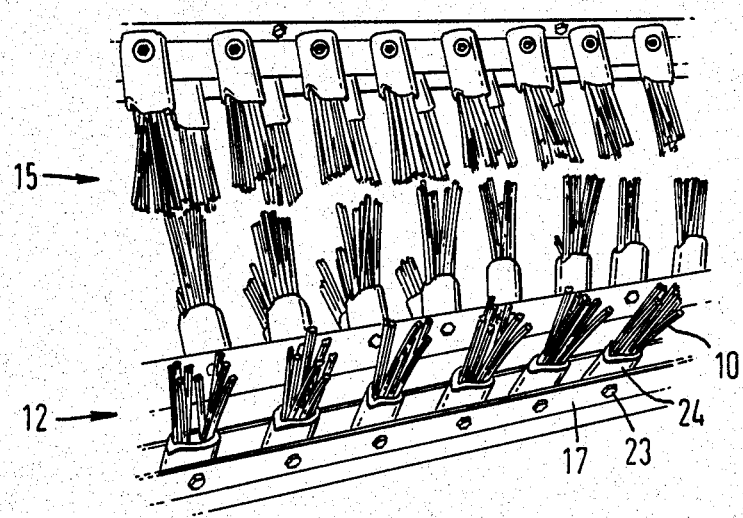
FIG. 3 is a perspective view showing in detail tufts of conditioning elements forming part of the conditioning apparatus shown in FIGS. 1 and 2.
Figure 4:
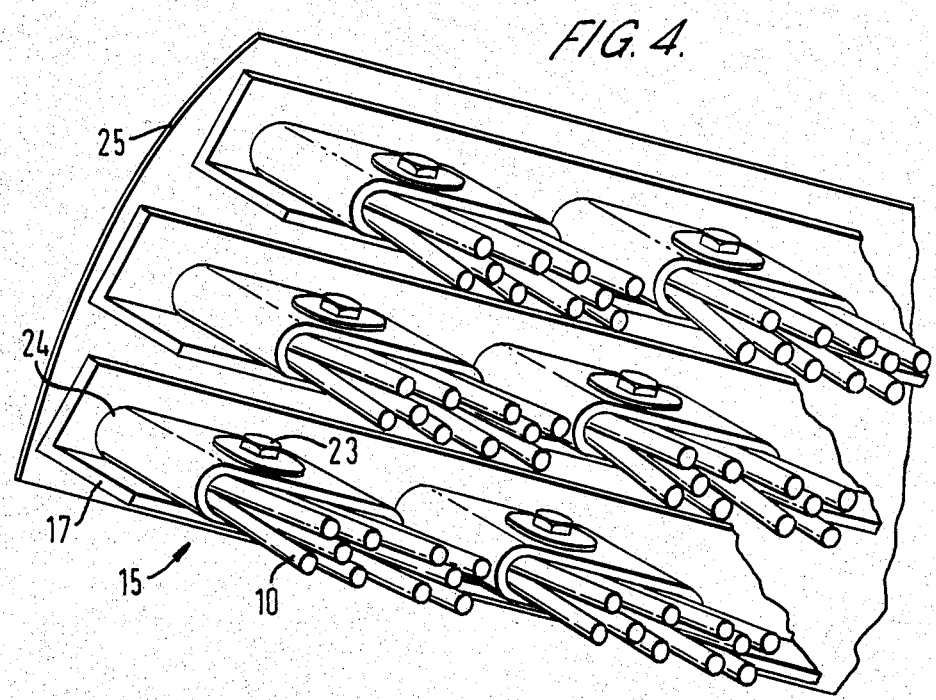
FIG. 4 is a perspective view of the underside of the stationary crop conditioning device shown in FIGS. 1, 2 and 3.

FIG. 2 shows a perspective rear view of the rotary brush 12 and the stationary brush 15, viewing the brushes under the rear part of the hood 13. FIG. 3 shows a detail of a construction of mounting means for the filaments, and FIG. 4 shows a detail of the construction of the stationary brush 15.

With reference to FIGS. 2 and 3 there will firstly be described the construction of the rotary brush 12. The brush 12 consists of a support rotor 16 formed by eight axially extending angle iron bars 17 fixed between end side plates 18'. The support rotor 16 is mounted for driven rotation on a main frame (not shown) of the apparatus which also supports for driven rotary movement (in known manner) a pair of cuttng drums 19 shown generally in FIG. 1. The skirts 20 and cutting elements 22 of the drums 19 are visible in FIG. 2 beneath the rotary brush 12.

Mounted on each angle bar 17 is a row of tufts of filaments 10. Each tuft is formed from a bundle of filament lengths which are bent over into a U-shape and secured to the bar 17 by a bolt 23 passing through a supporting and protective sleeve 24 for each tuft. The sleeve conveniently consists of reinforced rubber tubing, the outer rubber layer being reinforced by fibrous threads running along the length of the tubing or hose. As shown in FIG. 3, the single bolt 23 slightly compresses the sleeve 24 and produces a bundle of substantially parallel filaments distributed with a degree of randomness at their tips.

The tufts of filaments 10 are bolted to the outstanding flange of the angle bar 17 on the trailing face of the outstanding flange of the bar, relative to the direction of rotation of the rotor. In use the front wall of each angle bar 17 shrouds the lower part of the tuft of filaments 10 in the channel of the angle bar.

In FIG. 4 there is shown from the underside a perspective view of the stationary brush 15 shown in FIGS. 1 and 2. The tufts of filaments 10 may conveniently be identical to the filament tufts shown in FIG. 3, except that the angle bars 17 are bolted to a support plate 25 (omitted from FIG. 1 for simplicity) secured to the underside of the hood 13.

In FIGS. 2, 3 and 4, the filaments 10, conveniently of polypropylene or nylon rods, are shown as having a circular cross-section. Whilst such a cross-section gives an acceptable performance, a preferred cross-section is trilobate. Such a cross-section is shown in FIGS. 5, 6 and 7, which also illustrate an alternative form of mounting of the tufts of filaments 10. In the modification of FIGS. 5, 6 and 7, the tufts of filaments are held within the protective sleeves 24 by two bolts 23' and 23" and the outer bolt 23' has an internal spacing washer 26 which maintains the filaments on either side of the washer in two separate tufts, rather than a single tuft emerging from the sleeve 24 as shown in FIGS. 2, 3 and 4.

Returning now to consideration of the general principle of operation of the apparatus shown in FIGS. 1 to 4, the conditioning apparatus 11 is positioned as has been described behind a drum type rotary mower, and the entire assembly is either tractor mounted or tractor towed in known manner, and is driven from the power take-off (p.t-o.) of the tractor. In use the cut crop from the cutter 19 is conveyed into the passage 14 by the rotary brush 12. The presence in the passage 14 of the stationary brush 15 restrains the conveyed crop and thereby causes slippage between the crop and the rotary brush 12. Relative movement of the crop rearwardly relative to the filaments of the rotary brush 12 and forwardly relative to the filaments of the stationary brush 15 is thus induced. Said movement causes the filaments of both brushes 12 and 15 to condition the crop by surface damage. Although the precise conditioning effect will vary according to the crop and the operating conditions, it is expected that normally the conditioning is effected by the filaments of the brushes abrading the surface of the crop, although in some cases surface damage by multiple lesions and gentle multiple impact of the tips of the conditioning elements may also cause surface damage. The object of such surface conditioning of the crop is the removal or displacement of the epicuticular wax and surface damage of the cuticle.

Conveniently the rotor 12 is rotated at a speed such as to throw off the crop to fall downwardly to the ground. In some arrangements there may be provided an optional stripping rotor of known kind (shown in later Figures) for stripping off the rotor any crop remaining as the filaments approach the arcuately downward portion of their paths. Such a stripping rotor would operate in the same sense of rotation as the rotor 12. Crop from the conditioning device falls onto the stubble in a loosely structured swath or windrow which has good resistance to settling.

The conditioning devices of the present invention are susceptible to a wide measure of variation, and there will now be described a large number of alternative forms of the conditioning devices themselves, and of the configurations of such devices within a conditioning apparatus. It will be appreciated that the various different conditioning devices (generally called brushes in this description) are interchangeable within the various configurations described.

Referring firstly to FIG. 4, it will be noted that the tufts of filaments 10 are fairly closely spaced together, and that tufts in succeeding rows are offset from each other so that a tuft in one row fills the gap between tufts in a preceding tow. The tufts on the rotary brush 12 are similarly offset from each other. In modifications of such tuft arrangements, the tufts may be spaced apart more widely and the gaps between tufts in one row may be filled out entirely by tufts in the succeeding row but by combinations of staggered tufts in the next two or even more rows. With such an arrangement it may be advantageous to set the tufts of filaments along helical patterns so as to exert on the crop a degree of movement along the axis of the rotary brush, that is to say transversely relative to the passage 14.

Figure 8A:
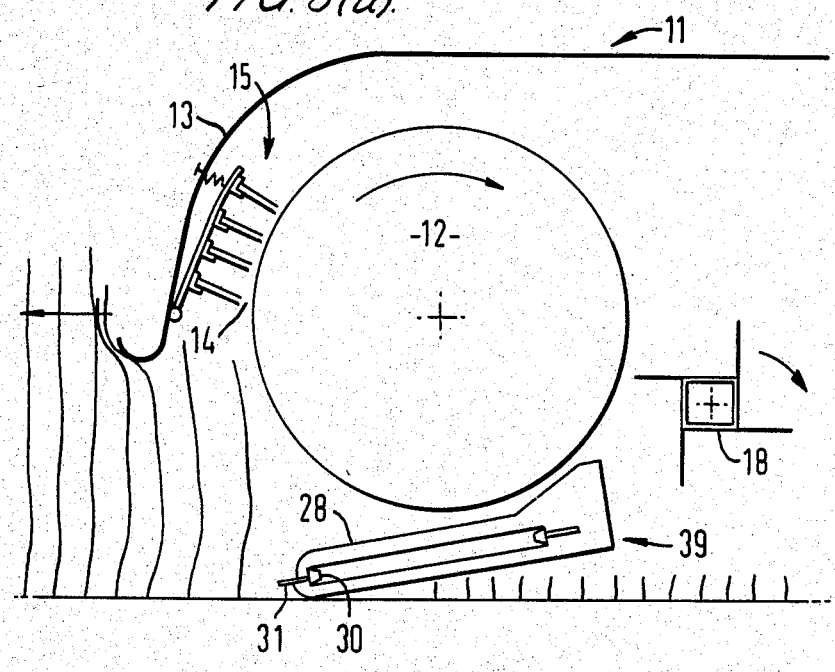
FIG. 8(a) is a diagrammatic side view of a crop conditioning apparatus similar to that shown in FIG. 1 but arranged for use with a belt mower.
Figure 8B:
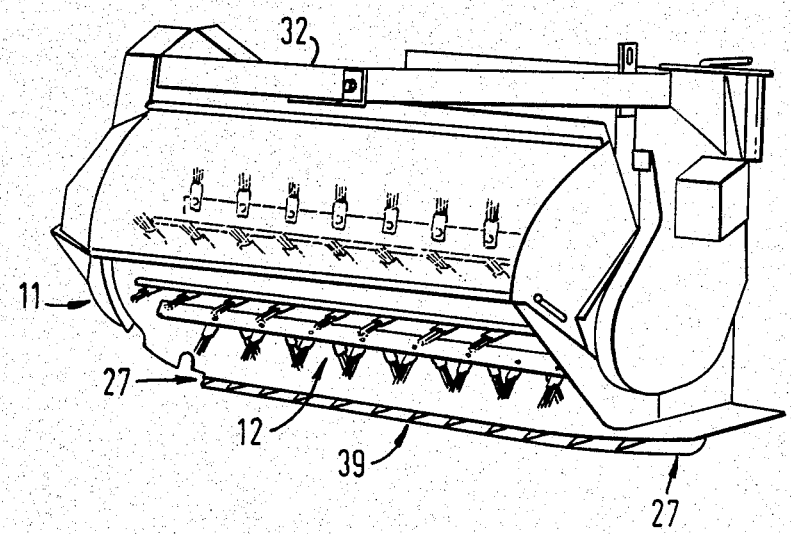
FIG. 8(b) is a front perspective view of the apparatus shown in FIG. 8(a)

There will now be described with reference to FIGS. 8(a) and 8(b) a modification of a cutter and conditioning device combination embodying the invention which makes particular use of the helical patterns of tufts referred to above. FIG. 8(a) shows a diagrammatic side view corresponding generally to FIG. 1 of a conditioning apparatus indicated generally again at 11 and positioned over a belt mower 39. Such a belt mower 39 is known in itself and comprises a flat casing 28 in which are housed two horizontally spaced pulleys (the positions of which are indicated generally at 27 in FIG. 8(b)) around which is entrained a belt 30 carrying outwardly directed cutting elements 31. The cutting is effected (in known manner) by unidirectional movement of the knives 31 over substantially all of the front traverse of their path although some cutting is effected by a part circular path of the cutting knife 31 as it moves around the pulleys 27. The conditioning device 11 operates in generally the same manner as described with reference to FIG. 1, the brushes 12 and 15 being indicated diagrammatically by the same reference numerals as in previous Figures. In FIG. 8(b) there is shown the main frame 32 on which the conditioning device 11 and the belt cutter 39 are both mounted, to be driven from the p.t-o. of the tractor on which the frame 32 is mounted.

Where a rotary brush 12 is used in connection with a belt cutter 39, two particular advantages arise in addition to the improved conditioning effected on the crop. Firstly, the filaments or tufts of filaments can be arranged in a helical pattern along the axis of the rotary brush so as to impart to the crop a sideways force along a direction parallel to the axis of the rotary brush and in a sense opposite to the sideways force applied to the crop by virtue of the unidirectional movement of the cutters 31. Such a compensating force applied to the crop can provide improved cutting, and improved transport of the crop away from the cutters. A second advantage which can be provided by a rotary brush with a belt cutter is that the brush can be arranged to grip the crop before the crop is cut, and to tension the crop so gripped against the cutters of the belt cutter to provide a degree of shear cutting which is not normally available with a belt cutter. These two advantages occur to a much greater degree than would arise say with a known spoke conditioning rotor. This is due to the greatly increased gripping action of the filaments of a conditioning device as hereinbefore defined in accordance with the invention.

In FIG. 8(c) there is shown a modification of the apparatus shown in FIGS. 8(a) and 8(b) in which the sense of rotation of the rotary brush 12 is reversed so that the rotary brush clears crop away from the belt mower 39 by sweeping the crop rearwardly across the top of the casing 28 rather than lifting the crop up and over the rotor 12. To the rear of the casing 28 of the belt mower 39 is provided a stationary brush 15 acting as a conditioning device and producing a conditioning action corresponding to the action of the stationary brush 15 in the preceding embodiments. In this embodiment, the passage 14 through which the crop is conveyed is defined between the rotary brush 12 and the top of the casing 28 continued back to the stationary brush 15. Behind the stationary brush 15 is a stripping rotor 18 (of known kind) which rotates in the same sense as the rotary brush 12, and strips crop from the brush 12 and directs it downwardly to the ground.

The two advantages outlined above in connection with combining the rotary brush 12 and a belt mower 39, are also provided in the modification of FIG. 8(c) and indeed are accentuated by the reverse, 'undershot' sense of rotation of the rotor 12. In particular the shear element thus introduced into the impact cutting is very beneficial to the efficiency of cutting.

In the machines described with reference to FIGS. 1 to 8(c), the stationary brush 15 has in each case constituted a crop flow modifying means (also referred to as a crop slippage means) for producing or enhancing slippage of the crop passing through the passage 14, the slippage occurring both relative to the stationary brush 15 and the rotating brush 12. In each case the crop flow modifying means has taken the form of a stationary restraining means for effecting the crop slippage by restraining movement of the crop through the passage 14.

There will now be described with reference to FIG. 9(a) an alternative arrangement of conveying rotor and crop flow modifying means in which the crop flow modifying means is active rather than stationary. FIG. 9(a) is a side view in cut-away form of a conditioning apparatus 11 suitable for trailing behind a tractor and for conditioning previously cut crop lying on the ground. (It will be appreciated that the use of the device to be described is not precluded from operation with a cutting means for cutting standing crop in modifications of the apparatus.) The conditioning apparatus 11 has several elements in common with the previously described apparatus and such common elements will be indicated by like reference numerals. The apparatus 11 comprises a rotary brush 12 mounted for rotation in bearings 34 mounted on part of the main frame 32 of the conditioning apparatus. The frame is mounted for movement over the ground level indicated at 35 in the direction from right to left in the Figure as indicated by the arrow, and the rotary brush 12 is coupled by gearing (not shown) to the p.t-o. of the towing tractor and arranged to be driven in a clockwise direction as indicated by the arrow.

A hood 13 extends from a position in front of the rotor 12 upwardly and rearwardly to terminate at a supporting member 36 positioned at about the '11 o'clock' position in relation to the rotor 12. Above and slightly to the right of the member 36 is positioned a second conditioning device in the form of a second rotary brush 37 constructed in similar manner to the main rotary brush 12, but of smaller diameter, and having fewer rows of tufts of filaments angularly spaced around the rotor. The rotary brush 37 is mounted for rotation in bearings 38 suspended from an upper frame member also forming part of the main framework 32 of the apparatus. The rotary brush 37 is coupled to the gearing of the main brush 12 and arranged to be driven in the opposite sense to the rotation of the main rotor 12, as indicated by the arrow.

In different arrangements of this embodiment, the second rotor 37 may be positioned at different angular positions relative to the rotor 12 (for example between the 9 o'clock and 12 o'clock positions). Other factors which can be varied include the relative and absolute rates of rotation of the brushes 12 and 37, the brush diameters and the degree of spacing apart, or overlap, of the tips of the opposed filaments of the two brushes.

Considering firstly the relative rates of rotation of the two brushes, the second brush 37 preferably constitutes a crop flow modifying means for producing or enhancing relative movement, or slippage, of crop passing between the brushes, this being achieved by a difference in the linear velocities of the tips of the opposed filaments.

It is preferred that the relative rates of rotation of the two brushes shall be such as to produce a difference in the tip linear velocities. In such a case the second brush 37 acts as crop flow modifying means for producing or enhancing slippage of the crop relative to the filaments, and such slippage contributes to the conditioning of the crop.

As can be seen from FIG. 9(a), the mountings of the filaments may correspond exactly to the mountings described with reference to FIGS. 2, 3 and 4, or as modified in FIGS. 5, 6 and 7. By way of example the diameter of the rotary brush 12 may be 560 mm, and the diameter of the secondary rotary brush 37 may be 410 mm. By way of example of ranges of diameters which may be used, the diameter of the lower rotos 12 may be in the range 350 mm to 700 mm, and the diameter of the rotor 37 may be in the range 700 mm to 350 mm. Preferably the rates of rotation are arranged, in conjunction with the diameters of the rotors, to be such that the velocity at the tips of the filaments of the rotor 12 is in the range 10 to 40 m per second, most preferably in the region of 24 m per second, and the differential velocity between the tips of opposed filaments is in the range of ±50%, conveniently in the region of ±30%. Where the filament tips of the second rotor 37 have a greater linear velocity than the filament tips of the rotor 12, the brush 37 acts as an accelerating rotor tending to move the crop over the main rotor 12. Where the secondary brush 37 has a tip velocity less than the tip velocity of the main rotor 12, the secondary brush 37 acts as a restraining means tending to restrain movement of the crop.

FIG. 9(b) shows in diagrammatic form a slightly modified arrangement of the embodiment of FIG. 9(a), in which the rotor and hood configuration are varied.

FIG. 9(c) shows in diagrammatic form a modification of the embodiment of FIG. 9(a), in which the secondary rotor 37 is arranged to rotate in the same sense as the main rotor 12. The secondary rotor 37 is repositioned at a position corresponding to '9 o'clock', and the hood 13 of FIG. 9(a) is replaced by a two-part hood around the main rotor. A plate 103 extends horizontally to define with the brush 12 a downstream part 14a of the passage, and a curved front plate 105 extends in front of the brush 37 to define therewith an upstream part 14b of the crop passage. In use the main rotary brush 12 is rotated clockwise as shown in FIG. 9(c) and the secondary rotary brush 37 is rotated in the same sense at a rate of rotation which provides a substantially slower velocity at its filament tips than at those of the main brush 12. The two sets of the filaments abrade and thereby condition the crop in generally the same manner as has been described in the preceding embodiments, with each acting as crop stripping means for the other.

Referring now to FIG. 9(d), a crop conditioning apparatus generally indicated at 11 is of similar construction to the device 11 in FIG. 9(c), and identical reference numerals are used to identify similar parts. However in the appartus of FIG. 9(d) the secondary brush 37 is arranged to be driven in the opposite rotational sense to the main brush 12 and the front plate 105 is shorter and shaped to terminate slightly rearwardly and below the upper extremity of the secondary brush 37. The apparatus 11 operates in similar manner to the apparatus of FIG. 9(c) except that the filaments of the brushes 37 and 12 are moving in the same linear direction but at different speeds when they contact the crop. FIG. 9(e) shows a further alternative arrangement, similar to that of FIG. 9(d).

The crop conditioning apparatus of FIGS. 9(c) and 9(d) can be used as pick-up conditioners for collecting previously cut crop on the ground, or as replacements for the crop conditioning apparatus shown in preceding embodiments in combination with a mower.

It is to be appreciated that there may be provided in accordance with the invention in some aspects a two brush arrangement in which both brushes are of equal size and driven at identical peripheral linear speed and direction, but the cooperating position of the brushes is such that transverse rows of filaments intermesh in the manner of two gear wheels, that is to say have a negative clearance.

There will now be described a number of other variations and modifications of the filaments which may be used, and of the configurations of conditioning devices, passageways and cutting devices which may be used. It will be appreciated that many of these variations may form permutations not specifically indicated among the various features described.

FIG. 10 illustrates in diagrammatic side view, partly in cross-section, a modification of the crop conditioning apparatus shown in FIG. 1, in which the drum mower 19 is replaced by a disc mower 29. The hood 13 is extended forwardly over the disc mower 29, as compared with the device of FIG. 1. The apparatus shown in FIG. 10 includes a stripping rotor 18, which has been mentioned as an optional feature, and which can be utilised in combination with the apparatus of FIGS. 1 and 8(a) and as appropriate with other embodiments. In FIG. 10, the stripping rotor 18, which may be of known design but with its paddles consisting preferably of yielding material, is rotated in the same sense as the rotary brush 12, and acts to strip crop off the brush 12.

FIG. 10(a) shows a modification in which the brush conveying means is contoured to match the shape of a disc mower. A similar arrangement may be used with drum mowers.

In FIG. 11 a further modification of the apparatus shown in FIG. 1 includes a modified stationary brush 15 which is arcuate and is pivoted at 16 to the hood 13 at the forward end of the passage 14 and extends rearwardly along the passage to restrain the crop flow therethrough. (Similar pivoted arrangements have been shown but not described in earlier Figures). The distal end of the brush is supported by spring loaded support 17' extending from the hood 13 and adjustable to vary the angular position of the brush 15 about its forward pivot 16. An optional stripping rotor 18 is provided to remove conditioned crop from the brush 12 and discharge it onto the ground in a swath or windrow. The brush 15 of FIG. 11 may be of the same form as described with reference to FIG. 1, and other Figures, or alternatively may comprise individual filaments, not in tufts, and of somewhat larger diameter than those described hereinbefore. Such a brush will be described in more detail hereinafter with reference to FIG. 22.

Referring to FIG. 12, a crop conditioning apparatus 21 differs from FIG. 11 in that the stationary brush 15 is straight not arcuate. Further, the conditioning apparatus is combined with a disc mower 29 instead of the drum mower 19 of FIG. 11. The combined mower conditioner of FIG. 12 operates in substantially the same manner as that of FIG. 11 except for the manner in which the crop is cut and delivered to the crop conditioning apparatus from the disc mower, this manner of delivery being generally known in itself.

FIG. 13 shows a crop conditioning apparatus 31 modified from that shown in FIG. 12 in that the disc mower 29 is replaced by a belt mower 39.

FIGS. 14 and 14(a) show a crop conditioning apparatus 41 which can be used as a pick-up conditioner (i.e. for picking up cut crop from the ground, conditioning it and returning it to the ground in a swath or windrow) or in combination with a mower in a mower-conditioner of the kinds shown in FIGS. 11 to 13. In this connection, it should be appreciated that the crop conditioners of FIGS. 11 to 13 can readily be adapted as pick-up conditioners by removal of the cutter and appropriate choice of rotary brush construction. Modification of the hood 13 may also be required to ensure proper direction of the picked-up crop into the passage 14. The said pick-up conditioner can be tractor-mounted or trailed in the same manner as the mower-conditioners of FIGS. 11 to 13. The brush shown in FIG. 14 is applicable also to a twin brush arrangement of conditioning apparatus.

The crop conditioning apparatus 41 of FIG. 14 differs from the crop conditioning apparatus of FIG. 11 in that the construction of the rotary brush 12 is specified (and will be described hereinafter), the support 17' is not spring-loaded and the optional stripping rotor 18 has been omitted.

Referring now to FIG. 15, there is illustrated another crop conditioning apparatus (generally indicated at 51) which can replace the apparatus of FIG. 14 as a pick-up conditioner or in a mower-conditioner. This apparatus differs from the apparatus in FIG. 14 in the construction of the rotary brush 12 which will be described hereinafter.

FIG. 16 also illustrates an alternative crop conditioning apparatus (generally indicated at 61) to that of FIG. 14. The apparatus of FIG. 16 differs from apparatus in FIGS. 14 and 15 in the construction of the rotary brush which will be described hereinafter.

The manner of operation of the conditioning apparatus 41, 51 and 61 of FIGS. 14, 15 and 16 are substantially identical with that of apparatus 11 and therefore will not be described.

Referring now to FIG. 17, a crop conditioning apparatus generally indicated at 71 differs from the previously described devices of FIGS. 14 to 16 in that the brush 12 is replaced by a rotary conveyor 72. The conveyor 72 comprises a drum 72a having circumferentially spaced axially extending ribs 72b protruding radilly therefrom. These ribs 72b are of generally trapezoidal cross-section to facilitate crop slippage during conveying and subsequent conditioning by the stationary brush 15.

The apparatus 71 cannot be used very effectively as a pick-up conditioner without providing a rotary brush or other means for raising cut crop from the ground and delivering it to the passage 14. The apparatus 71 is intended primarily for use in combination with a cutter in a mower-conditioner or as a stationary mechanism. For example, it can replace machines 11, 21 and 31 in the mower-conditioners of FIGS. 11, 12 and 13 respectively.

The apparatus 71 operates in a similar manner to the device of FIG. 11 as previously described except that the rotor 72 has abrasion causing edges instead of filament tips.

Referring now to FIG. 18, a crop conditioning apparatus generally indicated at 81 comprises a driven rotary brush 82 identical with the previously described brush 12. A guide plate 83 extends substantially horizontally over the brush 82 to define therewith the downstream part 84a of a crop passage. The upstream part 84b of said passage is defined between the brush 82 and an arcuate front plate 85 which is adjustably mounted to vary the clearance thereof from the brush 82. The gap between plates 83 and 85 provides an inlet for air into the passage part 84a. At the upstream end of the plate 85 there is provided an inclined restrictor plate 86 having a serrated distal edge facing the brush 82 (as shown in FIG. 18(a)). The plate 86 serves the purpose of restraining crop flow into the passage 84b thereby causing slippage between the crop and the brush 82, which is rotated in a clockwise direction as viewed in FIG. 18. Said slippage results in abrasion of the crop by the filaments of the brush 82 and the serrated edge of the plate 86. In this manner cuticular damage is caused and epicuticular wax is abraded from the crop surface and the crop thus conditioned.

Apparatus 81 can be used as a pick-up conditioner or as a replacement for the crop conditioning machines 11, 21 and 31 of the mower-conditioners of FIGS. 11 to 13.

Figure 19:
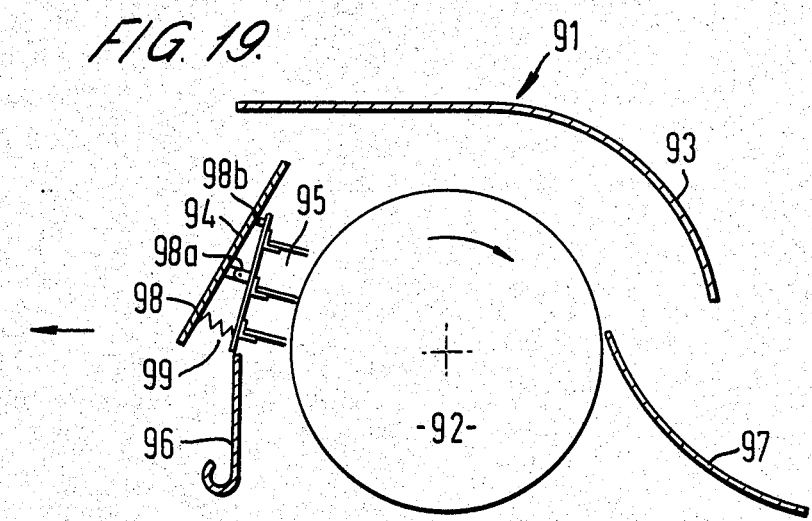

Referring now to FIG. 19, a crop conditioning apparatus is generally indicated at 91 in a mode intended for use as a pick-up conditioner. The apparatus 91 can readily be adapted for use in a mower by replacing the intake plate 96 (see below) with a shorter plate or removing said plate 96. The brush 92 of apparatus 91 can be any of the rotary brushes described above. Similarly, brush 95 can be any of the "stationary" brushes described above, although (as shown) the construction of FIG. 4 is preferred. The brush 95 is pivoted at 98a to a support plate 98 which is spatially fixed relative to the brush 92. A spring 99 acts between the support plate 98 and the lower end of the brush 95 to urge the upper end of the brush 95 against a stop 98b on the plate 98. The intake plate 96 depends below the brush and is fixed relative to support plate 98. A curved swath deflector plate 97 is provided to direct conditioned crop passing between the brush 92 and a hood 93 into a substantially horizontal path on leaving the conditioning device. The plate 97 causes the swath to be spread upwards into a more loosely arranged swath than if it fell, or was driven, onto the ground from above.

In use, the apparatus 91 operates in similar manner to machine 41 of FIG. 14 except that the sprung and pivotal mounting of the brush 95 automatically compensates for variations in the rate of feed of crop into the device.

Referring to FIGS. 14 and 14(a) the rotary brush comprises end plates between which are clamped a plurality of evenly spaced annular metal rings in the circumferential surface into which are wedged or otherwise secured tufts 2b of polypropylene rods. FIG. 14(a) shows that the tufts 2b of filaments 10 merge into each other before protruding from the end plates 2a. Said tufts 2b each are constituted by rods of 3 mm diameter circular cross-section or, preferably, rods of trilobate cross-section corresponding to three parallel 3 mm diameter circular cross-sectional rods welded together. Suitable there are about 10 of the cylindrical rods or 4 to 6 of the trilobate rods per cm$^2$.

The rotor 12 shown in FIG. 15 has a plurality of circumferentially spaced axially extending ribs 2c from each of which protrude two parallel rows of 6 mm diameter polypropylene rods 2d. Each pair of circumferentially adjacent rods 2d is constituted by the respective ends of a "U"-shaped length of rod having its base secured in the respective rib 2c. The ribs 2c are of similar shape to the ribs 72b of device 71 of FIG. 17.

FIGS. 16 and 20 show examples of brushes in which a plurality of circumferentially spaced axially extending ribs 2c project from a cylindrical drum 2a. These ribs 2c have a radially extending rear (with respect to the direction of rotation of the brush) face and a shorter radially extending front face, said faces being joined by a convexly arcuate upper face. Tufts 2b protrude radially immediately forwardly of the front face. Each pair of adjacent tufts 2b is constituted by a bundle of cylindrical polypropylene rods of 3 mm diameter or trilobate polypropylene rods of 3 mm diameter lobes. Suitably there are about 50 of the cylindrical rods or 6 to 8 of the trilobate rods in each bundle. The bundle is bent into a "U"-shape and the base thereof is clamped to the front face of the rib 2c by a metal plate (not shown) in similar manner to that described herein with reference to FIG. 3. In use, the ribs 2c constitute a shroud for the lower part of the following tuft 2b and the curved upper face of the ribs 2c limit the extend to which the preceding tuft 2b can bend.

Referring to FIG. 21, a brush has the same basic construction as that of FIG. 20 described above. However it also has pairs of rearwardly curved bars 2j protruding from the drum 2a to provide guards for the tufts 2b. The bars 2j of each pair are located on respective sides of a tuft 2b whereby the tuft can bend between the bars and thereby be protected against excessive bending and shear or impact damage by stones or other extraneous lumps of material.

FIGS. 22 and 23 show suitable brush parts for use in the stationary brush 15 in the machines of FIGS. 11 to 16 and 19.

Referring to FIG. 22, the brush part 165 has a base 161 from which protrude two rows of polypropylene rods 162. The rods 162 are constituted by the respective ends of "U"-shaped lengths of rod which are secured in the base 161 (see ghost lines in FIG. 22) and arranged so that the rods 162 of one row are staggered relative to the rods 162 of the other row.

However the brush of FIG. 4 is presently preferred for use as the stationary brush in the devices of FIGS. 11 to 16 and 19. It is constructed in similar manner to the preferred rotary brush of FIG. 2 in that tufts are formed of rod bundles bent into a "U"-shape and clamped to angle member 17 by a bolt and domes plastic washer 23. Two or more of such tuft-carrying angle members are secured to a support plate 25 to form the brush 15.

A brush part 185 of FIG. 23 has a plurality of polypropylene rods 182a aligned in a row and connected at a common base 182b to form a comb-like structure. The base is clamped to an angle member 183 by means of a clamping plate 184 and bolts 186. A similar construction to that of brush 185 can be used for part of the rotary brush in the crop conditioning apparatus of preceding Figures.

It will be appreciated that the invention is not restricted to the details described above with reference to the drawings but that numerous modifications and variations of said details can be effected without departing from the scope of the invention. In particular, the rods of the brushes can be of other materials than polypropylene which have the desired stiffness and wear characteristics, for example nylon. Further, the rods can be of other cross-sections than circular or trilobate, for example annular, triangular, rectangular or square, and can be secured in the brush in any suitable manner. Moreover, the crop-conditioning devices illustrated can readily be adapted for use at a stationary location to which cut crop is fed by, for example, a belt conveyor.

Typically, the main rotary brushes 12, and the rotary conveyor 72 will have an overall diameter of 560 mm and will be rotated at 500 to 1000 rev/min. Their axial length, and that of brushes 15, and plate 96, will be chosen having regard to the desired width of cut crop to be conditioned and the severity of treatment required. The free length of the rods of said brushes (both rotary and stationary) is between 50 and 100 mm; the individual rods or tufts in each row are spaced between 35 and 130 mm apart; and the adjacent rows are spaced apart by about 25 mm in the stationary brushes and rows 2d on each rib 2c of device 51, about 90 mm in brush 12 of device 41, or about 220 mm in the brush 12 of FIG. 16.

As has been mentioned, there may be provided adjustment of severity to crop treatment. The principal variables are stiffness of the filaments, rotor diameter and speed and the clearance between the conveying the slip inducing means, i.e. crop flow modifying means. Stiffness of filaments is determined largely by their free length, their cross-sectional area and shape and the type of material from which they are made.

It is to be appreciated that the brush rotors are not limited to being used in the horizontal attitude only. In practice two counter rotated brushes fitted vertically or inclined rearwardly, so as to cover the opening between the drums of two-drum mowers, are very effective and lead to very simple swath forming arrangements. Furthermore, the brushes do not need to be cylindrical, but can be of any other convenient shape, e.g. conical.

I claim:

1. A method of conditioning cut grass and other cut fibrous fodder crop, comprising the steps of:
   rotating a crop conditioning rotor about an axis which is substantially parallel to the ground, the conditioning rotor comprising a brush-like structure having a multiplicity of stiff, resilient, outwardly directed, elongate crop conditioning elements,
   conveying cut fibrous fodder crop by said rotor in a path leading upwardly and rearwardly over the rotor beneath a housing extending at least partly over the rotor,
   modifying the speed of movement of the crop produced by said brush-like structure by a crop flow modifying means positioned opposite the rotor for increasing relative movement between the crop and the brush-like structure, and
   conditioning the cut fibrous fodder crop by a stiff brushing action of the tips of said elements on the crop so as to damage the surface layer of stems and leaf of the fibrous fodder crop to assist subsequent moisture loss from stem and leaf of the crop,
   said stiff brushing action comprising
   engaging said fibrous fodder crop by spaced-apart, discrete tufts of crop engaging elements, the tufts being arranged so that tufts which are adjacent along a direction parallel to the axis of rotation of the rotor are spaced-apart from each other at the distal ends thereof,
   producing relative movement between the crop and said spaced-apart tufts of elements to give conditioning by abrasion,
   penetrating at least part of the stream of crop by said spaced-apart tufts of stiff resilient elements,
   producing yielding of the stiff, resilient, elongate elements in response to engagement with the crop at least predominantly by bending of the elements along at least part of the crop engaging portions of the length thereof, and
   effecting return of the elements to their undeflected dispositions when free from engagement with the crop at least predominantly by the effect of the stiffness of the elements.

2. A method according to claim 1 including the step of producing relative movement between the elements and the crop which, at the first contact between the tips of the elements and the crop, is greater than 10 meters per second.

3. A method according to claim 1 including the step of passing crop between two conditioning rotors positioned on opposite sides of the path of travel of the crop sufficiently close together for the outer perimeters of the rotors to overlap.

4. A method according to claim 1 including the step of retarding the crop by maintaining the said further conditioning device stationary.

5. Apparatus for conditioning cut grass and other cut fibrous fodder crop comprising:
   a mobile frame for movement over the ground, the frame having a passage for crop to be conditioned,
   a crop conditioning rotor for conveying crop along the passage and for conditioning crop by relative movement between the conditioning rotor and the crop, the conditioning rotor comprising a brush-like structure having a multiplicity of stiff, resilient, outwardly directed, elongate elements for conditioning the crop during the said relative movement between the elements and the crop, the elements being yieldable in response to engagement with the crop but being sufficiently stiff to penetrate at least part of the stream of crop conveyed by the rotor, the elements being yieldable at least predominantly by bending of the elements along at least part of the crop engaging portions of the lengths thereof, and the elements being sufficiently stiff to return to their undeflected dispositions when free from engagement with crop at least predominantly by virtue of the stiffness of the elements, and sufficiently stiff to produce conditioning of the crop by a stiff brushing action of the tips of the elements on the crop, the crop engaging elements being arranged in spaced-apart discrete tufts of elements, each tuft being formed of a plurality of lengths of resilient material doubled over and secured to a supporting base by a securing member passing through the fold of the doubled-over element lengths, the doubled-over material being secured in a sleeve of resilient material which supports and protects the tuft of elements at the base thereof, the discrete tufts of elements being arranged so that tufts which are adjacent to each other along a direction parallel to the axis of rotation of the rotor, are spaced-apart from each other at the distal ends of the tufts, the axial positions of the brush tufts being staggered around the rotor in such a manner that upon rotation of the rotor the gaps between the spaced apart tufts presented to the crops are filled at least partly by succeeding tufts, drive means for rotating the crop conditioning rotor about a horizontal axis so as to convey the crop upwardly and rearwardly over the rotor and to condition the crop by a stiff brushing action during the said relative movement between the elements and the crop, and crop flow modifying means positioned opposite the rotor for modifying the speed of movement of the crop produced by the rotor, so as to increase said relative movement between the crop conditioning elements and the crop.

6. Apparatus according to claim 5 in which the crop flow modifying means comprises restraining means mounted to be stationary in operation relative to the frame for restraining movement of the crop through the passage.

7. Crop conditioning apparatus according to claim 5 in which the said conditioning rotor and the said crop flow modifying means are each constituted by a crop conditioning device comprising a brush-like structure.

8. Apparatus according to claim 5, in which the crop flow modifying means and the conditioning rotor are rotary devices positioned on opposed sides of the crop passage and arranged to be driven in a manner such as to produce at opposed portions of the rotary devices different peripheral velocities of movement of the perimeters of the two rotary devices.

9. Apparatus according to claim 8 in which the crop flow modifying means comprises restraining means mounted to be stationary in operation relative to the frame for restraining movement of the crop through the passage.

10. Apparatus according to claim 8 in which the rotors are positioned sufficiently close together for the outer perimeters of the rotors to overlap.

11. Apparatus according to claim 5 in which the elements are yieldable by bending substantially along the whole of the free lengths thereof.

12. Apparatus according to claim 5, in which the tips of the elements are distributed substantially uniformly and the population of the elements at the tips lies in the range 1 to 20 elements per sq. cm.

13. Apparatus according to claim 5 in which the yieldability of an element is such that application of a load of 125 grams to the tip of an element having a free length of 100 mm produces a displacement of the element tip by an amount in the range 6 to 10 mm.

14. Apparatus according to claim 5 in which the ratio of the sides of a rectangular envelope containing a cross-section of an element does not exceed 4 to 1.

15. Apparatus according to claim 5, in which the maximum cross-sectional dimension of an element is in the range 1 mm to 20 mm.

16. Apparatus according to claim 5 in which the elements are of trilobate cross-section.

17. Apparatus according to claim 5 in which the conditioning device comprises a rotary conveying device, and in which there is provided drive means for driving the rotary conveying rotor at a rotational speed of 400 to 1700 rev/min.

18. Apparatus according to claim 5 in which the conditioning device comprises a rotary conveying device and in which there is provided means for driving the rotary conveying device at a rotational speed such as to provide a velocity in the range 10 to 40 m per second at the tips of the elements.

19. Apparatus according to claim 5 in which the said elements are formed of synthetic material.

20. Apparatus according to claim 5 in which the elements are made of material selected from the group comprising nylon, polypropylene, glass fibre, and carbon fibre.

21. Apparatus according to claim 5 in which the said frame is a mobile frame mounted for movement over the ground and the apparatus is arranged for collection of crop during movement of the frame over the ground and for depositing of conditioned crop onto the ground after the conditioning action.

22. Apparatus according to claim 5 in which the said frame is a mobile frame mounted for movement over the ground and the apparatus is arranged for the conditioning device to pick up previously cut crop lying on the ground.

23. Apparatus according to claim 5 in which the said frame is a mobile frame mounted for movement over the ground and the apparatus includes cutting means for cutting crop growing on the ground, the apparatus being arranged for the conditioning device to engage crop cut by the cutting means.

24. Apparatus according to claim 23 in which the conditioning device constitutes a crop conveying means, in which the cutting means operates by linear unidirectional movement of cutting elements over the major portion of their cutting paths and the conditioning device is arranged to grip growing crop and to tension the crop against the cutting means during the cutting operation.

25. Apparatus according to claim 22 in which the conditioning device constitutes a rotary crop conveying means, in which the cutting means operates by linear unidirectional movement of cutting elements over the major portion of their cutting paths, and in which the conditioning elements are arranged in a helical formation in a sense such as to exert on the crop a movement along the axis of the rotary conveying means opposed to the cutting direction of the said cutting elements.

26. Apparatus according to claim 5 in which the brush elements have differing lengths over the brush-like structure so as provide a less densely populated outer envelope of brush tips of the elements.

* * * * *